US008676655B2

(12) United States Patent
White et al.

(10) Patent No.: US 8,676,655 B2
(45) Date of Patent: Mar. 18, 2014

(54) DASHBOARD MAP FILTERING AND CLUTTER/DECLUTTER ALGORITHM

(75) Inventors: Chris L. White, Plano, TX (US); Evan Pedersen, Colorado Springs, CO (US); Edmund G. Dombrowski, Hamilton, VA (US); Eric S. DeRose, Fairfax, VA (US); David J. Vohsman, Manitou Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1671 days.

(21) Appl. No.: 11/771,337

(22) Filed: Jun. 29, 2007

(65) Prior Publication Data

US 2009/0006112 A1   Jan. 1, 2009

(51) Int. Cl.
*G06Q 30/00* (2012.01)
(52) U.S. Cl.
USPC .................................................. 705/26.1
(58) Field of Classification Search
USPC ............... 705/26, 27, 26.1, 26.2, 26.25, 26.3, 705/26.35, 26.4, 26.41–26.44, 26.5, 705/26.61–26.64, 26.7, 26.8, 26.81, 26.82, 705/26.9, 27.1, 27.2; 340/539.2
See application file for complete search history.

(56) References Cited

U.S. PATENT DOCUMENTS

| | | | | |
|---|---|---|---|---|
| 5,761,432 A * | 6/1998 | Bergholm et al. | ............ | 709/226 |
| 6,490,620 B1 * | 12/2002 | Ditmer et al. | .................. | 709/224 |
| 6,618,834 B2 * | 9/2003 | Takeyama et al. | ............ | 716/102 |
| 6,687,750 B1 * | 2/2004 | Messinger et al. | ............ | 709/224 |
| 6,952,729 B2 * | 10/2005 | Bialk et al. | ...................... | 709/224 |
| 7,143,100 B2 * | 11/2006 | Carlson et al. | ......................... | 1/1 |
| 7,475,363 B1 * | 1/2009 | Yehuda et al. | ................ | 715/853 |
| 2007/0164845 A1 * | 7/2007 | Ivins et al. | ..................... | 340/3.9 |

FOREIGN PATENT DOCUMENTS

JP       06-141029 A   *   5/1994

OTHER PUBLICATIONS

Kevin Xiaoguo Zhu "Sensor-based Condition Monitoring and Predictive Maintenance—An Integrated Intelligent Management Support System" Intelligent Systems in Accounting, Finance and Management, vol. 5: 241-258 (1996).*

* cited by examiner

*Primary Examiner* — Naeem Haq

(57) ABSTRACT

A device displays multiple products associated with a customer of a network and provided by the network, receives a customer selection of a filtering mechanism, and one of increases or reduces a display of the multiple products based on the customer selection of the filtering mechanism and based on device types associated with the multiple products.

25 Claims, 17 Drawing Sheets

DASHBOARD MAP FILTERING AND CLUTTER/DECLUTTER ALGORITHM

BACKGROUND

Large customers of network services may subscribe to different networks that include various types of inventory (e.g., circuits, devices, etc.). For example, a customer may subscribe to a private Internet Protocol (IP) network that provides private (e.g., secure) network services to the customer. The private IP network may include an inventory (e.g., circuits, devices, etc.) that may be provided throughout various locations (e.g., throughout various states, regions, countries, etc.). Portions of the inventory may require maintenance (e.g., a circuit may generate an alarm indicating a problem), and tickets may be generated, by a customer, to address any alarms and/or maintenance events. For example, a ticket may request that the network provider investigate an alarm generated by a circuit.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and methods that provide a dashboard page for presentation and/or mapping of a customer's inventory and any alarms, tickets, and/or maintenance events associated with the customer's inventory. For example, in one implementation, the systems and methods may provide dashboard map filtering and/or clutter/declutter algorithms that display one or more customer products (e.g., inventory, tickets, alarms, etc.) based on the filtering and/or clutter/declutter algorithms. The dashboard map filtering and/or clutter/declutter algorithms may receive a customer display selection, and/or may display one or more customer products based on the customer display selection. The dashboard map filtering and/or clutter/declutter algorithms may receive a customer selection of a circuit test and/or ticket creation, and/or may generate a request for a circuit test and/or ticket information based on the selection.

A "page," as the term is used herein, is to be broadly interpreted to include any machine-readable and machine-storable work product. A page may include, for example, an email, a web site, a file, a combination of files, one or more files with embedded links to other files, a news group posting, any of the aforementioned, etc. In the context of the Internet, a common document is a web page. Documents often include textual information and may include embedded information (such as meta information, images, hyperlinks, etc.) and/or embedded instructions (such as Javascript, etc.).

Figure 1:
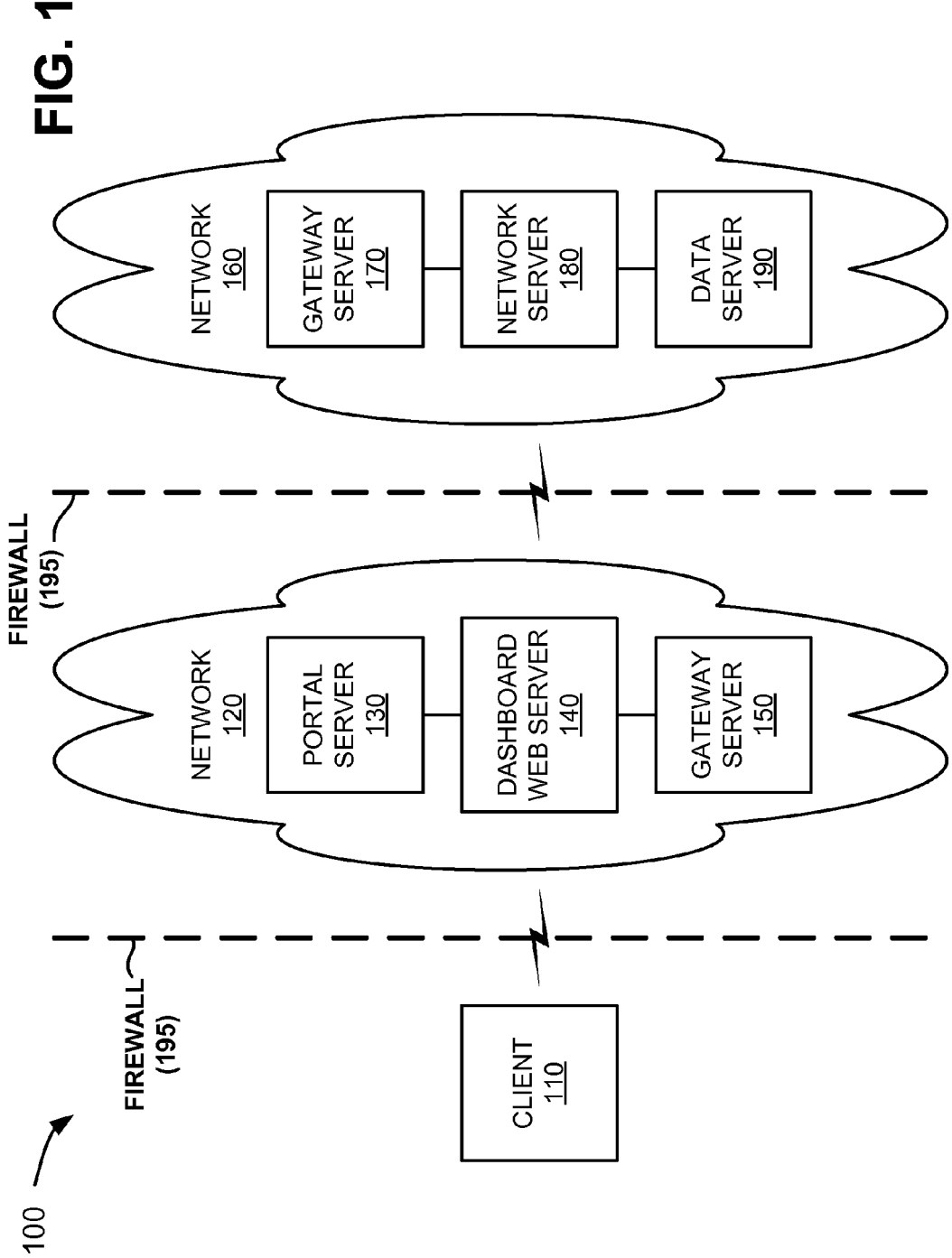
FIG. 1 is an exemplary diagram of a network in which systems and methods described herein may be implemented.

FIG. 1 is an exemplary diagram of a network 100 in which systems and methods described herein may be implemented. Network 100 may include a client 110, a network 120 that includes a portal server 130, a dashboard web server 140, and a gateway server 150, and a network 160 that includes a gateway server 170, a network server 180, and a data server 190. Portal server 130, dashboard web server 140, and gateway server 150 may be connected to one another via network 120. Gateway server 170, network server 180, and data server 190 may be connected to one another via network 160. One client, two networks, and six servers have been illustrated in FIG. 1 for simplicity. In practice, there may be more or less clients, networks, and/or servers. Also, in some instances, a client may perform one or more functions of a server, and a server may perform one or more functions of a client. Furthermore, in other instances, one of servers 130-150 and/or 170-190 may perform one or more functions of another one of servers 130-150 and/or 170-190. As further shown in FIG. 1, firewalls 195 may be provided between client 110 and network 120, and between network 120 and network 160.

Client 110 may include one or more entities. An entity may be defined as a device, such as a computer, a personal digital assistant (PDA), a laptop, or another type of computation or communication device, a thread or process running on one of these devices, and/or an object executable by one of these devices. In one implementation, client may enable a user to create, review, access, prioritize, etc. dashboard information (e.g., a user's inventory and any alarms, tickets, and/or maintenance events associated with the inventory) in a manner described herein.

Networks 120 and 160 each may include a Public Land Mobile Network (PLMN), a local area network (LAN), a wide area network (WAN), a metropolitan area network (MAN), a telephone network, such as the Public Switched Telephone Network (PSTN) or a cellular telephone network, an intranet, the Internet, or a combination of networks. In one implementation, networks 120 and 160 each may include a secure or private network, an intranet, a local network, applications and/or devices provided in a secure network, an intranet, or a local network, and/or any other network, device, application, and/or property that may require authorization and/or authentication. Client 110 may connect to network 120 via wired and/or wireless connections. Network 120 may connect to network 160 via wired and/or wireless connections.

Portal server 130 may include one or more server entities that gather, process, search, and/or provide information in a manner described herein. In one implementation, portal server 130 may provide a point of access to information which may be linked from various logically related applications. For example, portal server 130 may present information from diverse sources in a unified way, and may provide a way for enterprise systems to provide a consistent look and feel with access control and procedures for multiple applications. In another example, portal server 130 may provide personalized capabilities to its visitors (e.g., users or customers), providing a pathway to other content.

Dashboard web server 140 may include one or more server entities that gather, process, search, and/or provide information in a manner described herein. In one implementation, dashboard web server 140 may provide a dashboard that presents and/or maps a customer's inventory (e.g., circuits, devices, etc. associated with a customer's network) and any alarms, tickets, and/or maintenance events associated with the customer's inventory. For example, dashboard web server 140 may provide a dashboard interface group identifier that groups and/or correlates one or more customer identifiers into a single customer identifier. The dashboard interface group identifier may associate one or more customer products (e.g., inventory, tickets, alarms, etc.) with the single customer identifier, and/or may validate the single customer identifier. Further details of dashboard web server 140 are provided below in connection with FIGS. 3 and 8.

Gateway servers 150 and 170 each may include one or more server entities that gather, process, search, and/or provide information in a manner described herein. In one implementation, gateway servers 150 and 170 each may serve as an entrance to networks 120 and 160, respectively. For example, in enterprise systems, gateway servers 150 and 170 each may route traffic from a device outside of networks 120 and 160, respectively, and may act as a proxy server and/or a firewall. In another example, gateway servers 150 and 170 each may be associated with a router (e.g., which may use headers and forwarding tables to determine where packets may be sent), and a switch (e.g., which may provide a path for the packet in and out of gateway servers 150 and 170).

Network server 180 may include one or more server entities that gather, process, search, and/or provide information in a manner described herein. For example, in one implementation, network server 180 may include one or more of a formula server, an analytics server, a web services management server, etc.

Data server 190 may include one or more server entities that gather, process, search, and/or provide information in a manner described herein. For example, in one implementation, data server 190 may store customer data repositories (e.g., associated with users of client 110), may store information associated with one or more customer products (e.g., inventory, tickets, alarms, etc.), and/or may store any other information capable of being provided by dashboard web server 140 to a customer (or user) via client 110.

Firewalls 195 may include any mechanisms that may regulate the types of traffic entering and/or exiting a public and/or private network (e.g., network 120 and/or network 160). In one implementation, firewalls 195 may be implemented by devices provided within networks 120 and 160, such as gateway servers 150 and 170. In other implementations, firewalls 195 may be implemented by devices other than gateway servers 150 and 170.

Although FIG. 1 shows exemplary components of network 100, in other implementations, network 100 may contain fewer, different, or additional components than depicted in FIG. 1.

Figure 2:
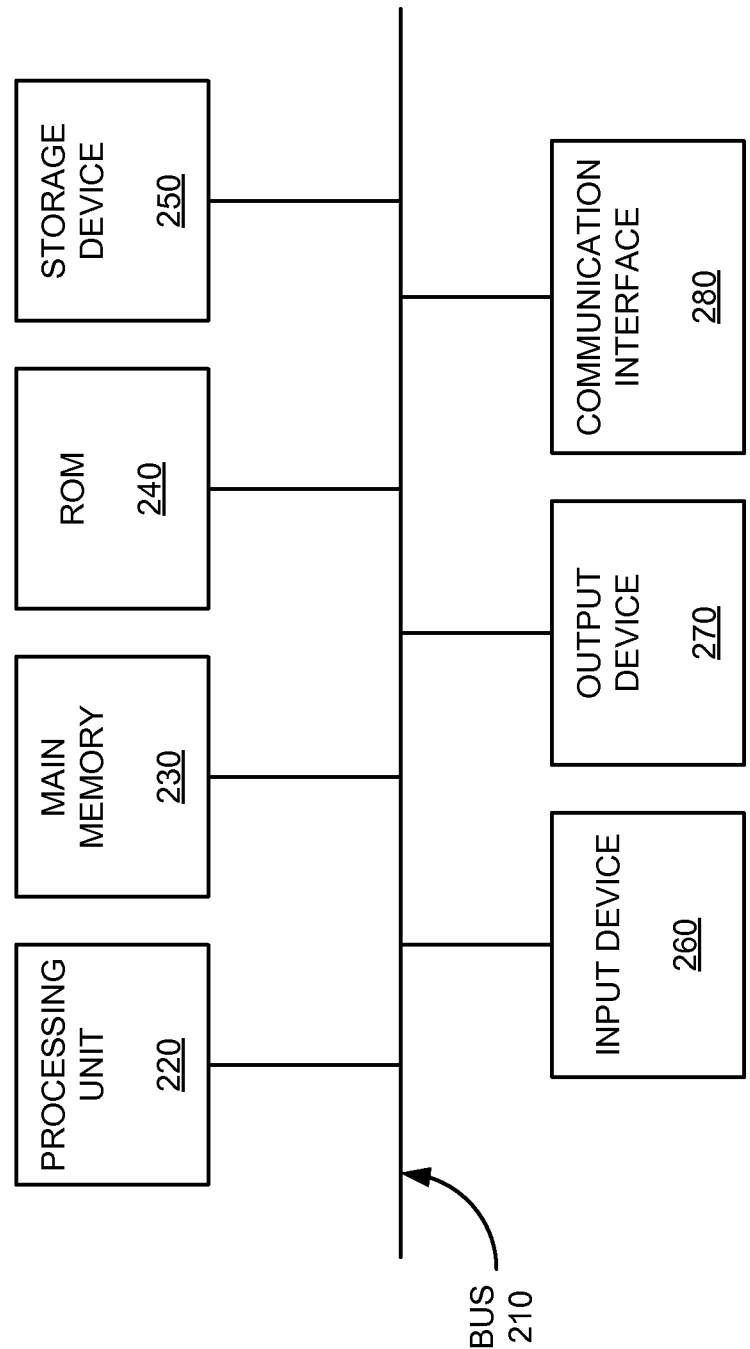
FIG. 2 is an exemplary diagram of a client and/or one or more servers of FIG. 1.

FIG. 2 is an exemplary diagram of a client/server entity corresponding to client 110 and/or servers 130-150 and 170-190. As illustrated, the client/server entity may include a bus 210, a processing unit 220, a main memory 230, a read-only memory (ROM) 240, a storage device 250, an input device 260, an output device 270, and/or a communication interface 280. Bus 210 may include a path that permits communication among the components of the client/server entity.

Processing unit 220 may include a processor, microprocessor, or other type of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to the client/server entity, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

As will be described in detail below, the client/server entity may perform certain operations in response to processing unit 220 executing software instructions contained in a computer-readable medium, such as main memory 230. A computer-readable medium may be defined as a physical or logical memory device and/or carrier wave. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer, different, or additional components than depicted in FIG. 2. In still other implementations, one or more components of the client/server entity may perform one or more of the tasks performed by one or more other components of the client/server entity.

Figure 3:
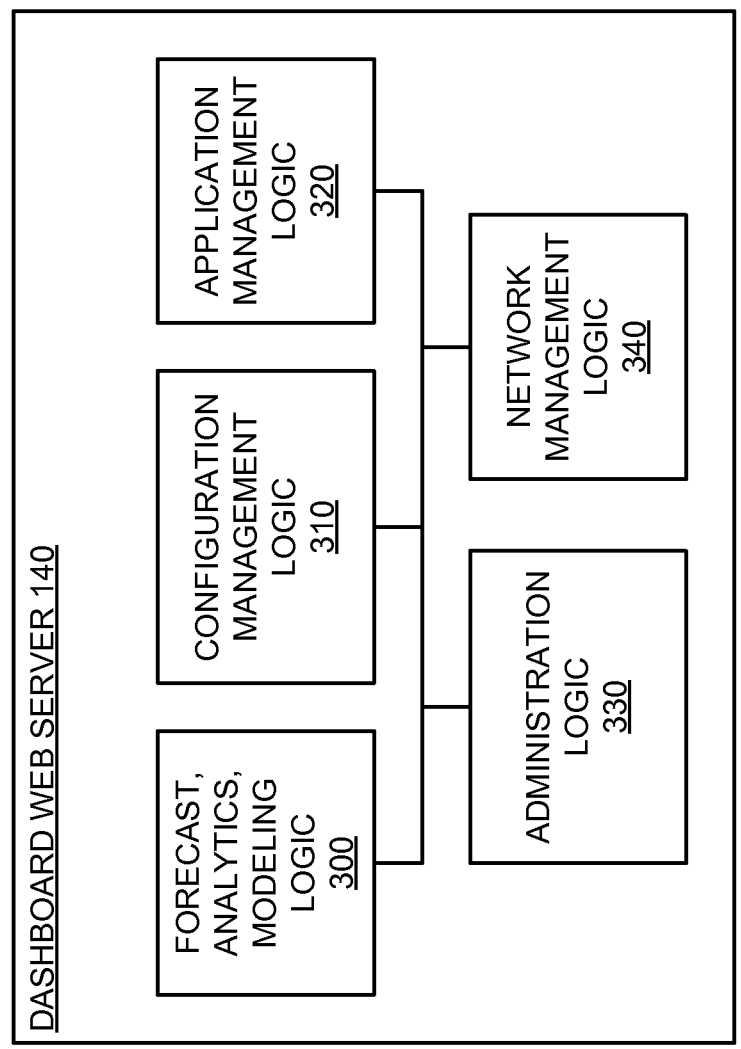
FIG. 3 is a diagram depicting exemplary functions capable of being performed by a dashboard web server of FIG. 1.

FIG. 3 is a diagram depicting exemplary functions capable of being performed by dashboard web server 140. As illustrated, dashboard web server 140 may include a variety of functional components, such as forecast, analytics, modeling logic 300, configuration management logic 310, application management logic 320, administration logic 330, and/or network management logic 340.

Forecast, analytics, modeling logic 300 may provide network modeling and/or capacity planning for a network associated with a customer (e.g., a user of client 110). For example, in one implementation, forecast, analytics, modeling logic 300 may permit a customer to perform network impact projections (e.g., on a network associated with the customer), expense planning (e.g., for the customer's network), and/or "what-if" scenarios (e.g., the customer may determine what would happen to the customer's network if an additional circuit was added).

Configuration management logic 310 may provide command and control capabilities of a network associated with a customer (e.g., a network provided by a dashboard generated by dashboard web server 140). In one implementation, configuration management logic 310 may permit a customer to manage a configuration of the customer's network. For example, configuration management logic 310 may permit the customer to create rules-based routing, and to request bandwidth on demand for the customer's network. In another example, configuration management logic 310 may permit the customer to test its network, and may provide the customer with network inventory and auto-discovery tools.

Application management logic 320 may provide business services management tools for a network associated with a customer. For example, in one implementation, application management logic 320 may permit the customer to perform general business outcome testing, business impact analysis, and/or true cost of service metrics for the customer's network. In another example, application management logic 320 may provide enterprise application interfaces (e.g., point-of-sale networks and kiosks), web hosting, and/or security management services for the customer's network.

Administration logic 330 may provide self service tools for a customer and a network associated with the customer. For example, in one implementation, administration logic 330 may provide service provisioning, a service catalog, account information, the customer's roles and entitlements, an account communicator, and/or online collaboration services for the customer's network.

Network management logic 340 may provide network operation services for a network associated with a customer. For example, in one implementation, network management logic 340 may provide fault and trouble management, network availability status, performance reporting, metric reporting, a network topology map, inventory and/or auto discovery services, security and/or threat identification services, and/or customer platform access services for the customer's network.

Although FIG. 3 shows exemplary functional components of dashboard web server 140, in other implementations, dashboard web server 140 may contain fewer, different, or additional functional components than depicted in FIG. 3. In still other implementations, one or more functional components of dashboard web server 140 may perform one or more of the tasks performed by one or more other functional components of dashboard web server 140.

Figure 4:
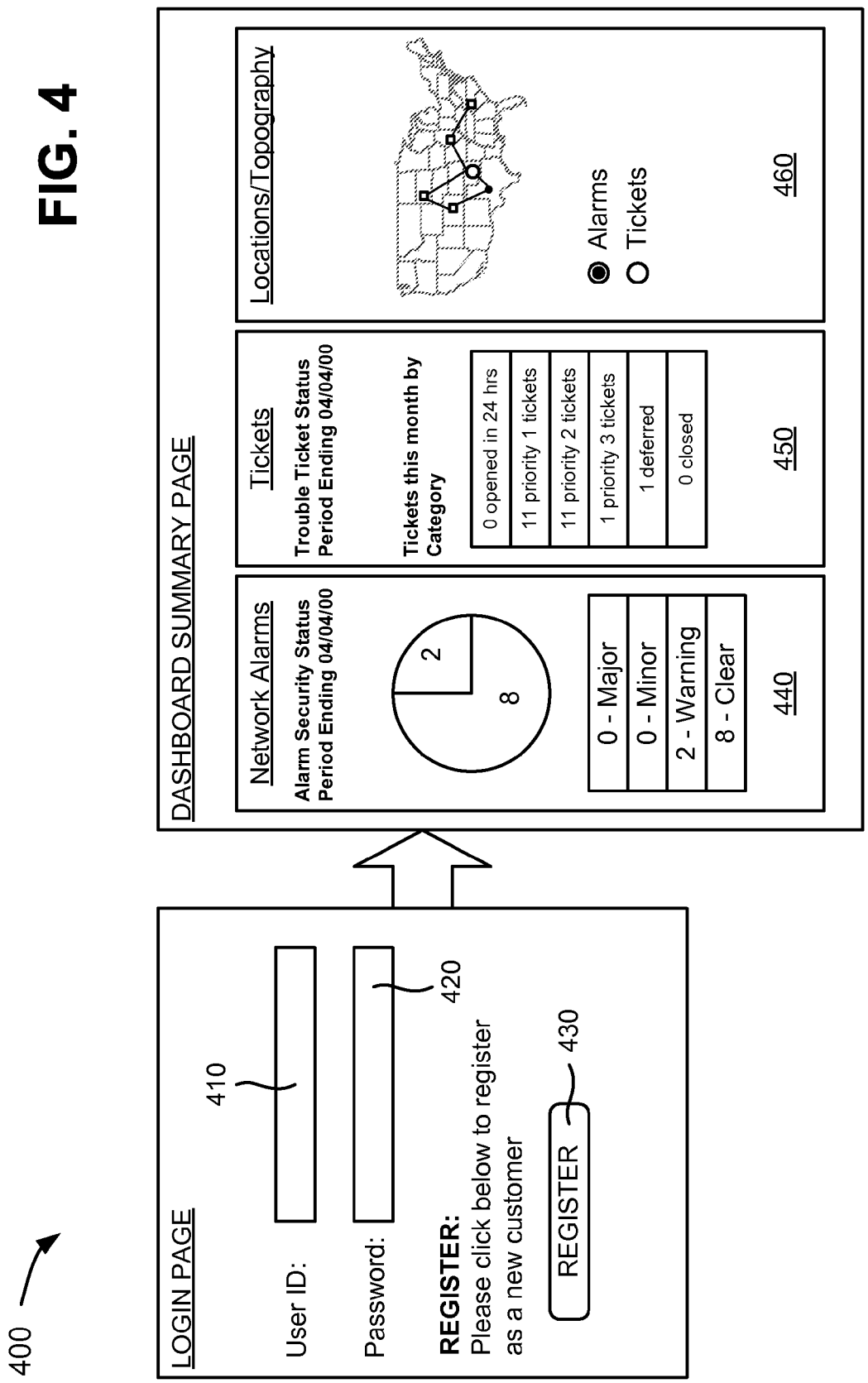
FIG. 4 is a diagram of an exemplary user interface that depicts a login page and a dashboard summary page, and may be provided by the dashboard web server of FIG. 1.

FIG. 4 is a diagram of an exemplary user interface 400 that depicts a login page and a dashboard summary page. In one implementation, user interface 400 may be provided by dashboard web server 140 to client 110. As illustrated, the login page of user interface 400 may depict a variety of mechanisms for a user (e.g., via client 110) to access information about a network, such as a user identification (ID) field 410, a password field 420, and/or a mechanism 430 to enable a new customer to register.

User ID field 410 may enable a customer to enter customer identification information (e.g., a numeric string, a string of letters, an alphanumeric string, etc.) that may identify the customer to dashboard web server 140. Password field 420 may enable the customer to enter a unique password (e.g., a numeric string, a string of letters, an alphanumeric string, etc.) that may ensure dashboard web server 140 that the customer identified in user ID field 410 is a valid customer. Dashboard web server 140 may compare the information entered in user ID field 410 and/or password field 420 to a database in order to provide secure access to the customer's network information.

Register mechanism 430 may include a button, an icon, a link, and/or other similar selection mechanisms. If a customer selects register mechanism 430, the customer may be permitted to register as a new customer with dashboard web server 140. For example, the customer may be presented with a user interface that enables the customer to enter registration information (e.g., a user ID, a password, one or more networks associated with the customer, customer billing information, a mailing address, etc.). If a customer registers with dashboard web server 140, the customer may be able to access the services provided by dashboard web server 140 via user ID field 410 and/or password field 420.

If a customer successfully logs into dashboard web server 140 (e.g., via input of correct information into user ID field 410 and password field 420), user interface 400 (e.g., via dashboard web server 140) may present the dashboard summary page shown in FIG. 4. As illustrated, the dashboard summary page of user interface 400 may provide a variety of information about one or more networks associated with a customer (e.g., a customer who accessed dashboard web server 140 via the login page). For example, the dashboard summary page may provide a network alarms section 440, a tickets section 450, and/or a locations/topography section 460.

Network alarms section 440 may display any alarm conditions occurring in the customer's network, and/or the severity of any alarm conditions. For example, as shown in FIG. 4, the customer's network may include "0" major network alarms, "0" minor network alarms, "2" warning network alarms, and/or "8" network alarms that have cleared alarm status (e.g., an alarm does not exist anymore).

Tickets section 450 may display any tickets related to a maintenance event and/or an alarm condition. A "ticket," as the term is used herein, is to be broadly construed to include a mechanism (e.g., a trouble ticket or trouble report) that may be used to track detection, reporting, and resolution of some type of problem (e.g., an outage in the customer's network). For example, a ticket may be created by a trouble ticketing system as specified by the Internet Engineering Task Force (IETF) in RFC 1297, ticketing software, etc. In another example, a ticket may define a problem and may help to coordinate with people who may work on the problem. In still another example, as a ticket moves though a system (e.g., via dashboard web server 140), it may be classified as a certain type of problem, which in turn may determine an expertise level of people assigned to address the ticket. If a problem is not resolved, an "open ticket" for the problem may remain in a work queue. If a problem is resolved, a ticket may be "closed."

Returning to FIG. 4, tickets section 450 may provide a status of a ticket, and/or may display a number of tickets in a time period (e.g., monthly, weekly, etc.) by category (e.g., priority, opened, closed, etc.). For example, as shown in FIG. 4, tickets section 450 may indicate that "0" tickets have been opened in the past twenty-four hours, "11" tickets are priority "1" tickets, "11" tickets are priority "2" tickets, "1" ticket is a priority "3" ticket, "1" ticket has been deferred, and "0" tickets have been closed.

Locations/topography section 460 may provide a visual display (e.g., a map) of locations of inventory items of the customer's network, and/or any alarms and/or tickets associated with the customer's inventory items. For example, as shown in FIG. 4, an alarm may exist for an inventory item (e.g., a circuit, a node, a device, etc.) located in Texas, and a ticket may exist for an inventory item located in Oklahoma.

The dashboard login and summary pages depicted in FIG. 4 and other dashboard-related pages (e.g., FIGS. 5-7) may collect and display a customer's inventory (e.g., circuits, devices, etc. of a network associated with the customer), and/or any alarms, tickets, and/or maintenance events associated with the customer's inventory. In one implementation, the dashboard-related pages may display a map providing locations of the customer's inventory, and/or any alarms, tickets, and/or maintenance events occurring at such locations. A user of the dashboard-related pages may zoom in on any one of the locations and may view specific details of a site, equipment, circuits, etc. at the location, and/or any alarms, tickets, maintenance events, etc. associated with the location. The map may include symbols (e.g., icons) with unique shapes and/or color coding which may correspond to inventory items, alarms, tickets, maintenance events, etc. In other implementations, the dashboard-related pages may display the customer's inventory, and/or any alarms, tickets, and/or maintenance events associated with the customer's inventory in one or more pop-up windows, in a tabular format in one or more windows, in a spreadsheet-like format in one or more windows, etc. In other implementations, the dashboard-related pages may provide a customer-specific, consolidated near real-time view of operational data (e.g., network performance, trouble management, etc.), and/or may provide customizable views and access for customers to services and performance information.

In one exemplary implementation, dashboard web server 140 may consolidate such information (e.g., inventory, alarms, tickets, maintenance events, etc.), and may correlate the information via an interface group identifier (e.g., for inventory and/or tickets), as described herein, and/or via circuit or device identifications (e.g., for alarms and/or maintenance events). In another exemplary implementation, dashboard web server 140 may include the features set forth in co-pending application Ser. No. 11/771,545, entitled "DASHBOARD INTERFACE GROUP IDENTIFIER," filed on the same date herewith, the disclosure of which is incorporated by reference herein in its entirety. In still another exemplary implementation, dashboard web server 140 may include the features set forth in co-pending application Ser. No. 11/771,365, entitled "DASHBOARD MAINTENANCE/OUTAGE CORRELATION," filed on the same date herewith, the disclosure of which is incorporated by reference herein in its entirety.

Dashboard web server 140 may include a network availability algorithm that may be based upon ticket outage time data (e.g., provided in data server 190). For example, dashboard web server 140 may correlate customer information to network inventory used for service to the customer associated with the customer information. Based upon the inventory assigned to the customer, dashboard web server 140 may collect an outage time per item of inventory (e.g., per circuit). This information may be stored in data server 190 and may include a link to an inventory system which dashboard web server 140 may also use. The outage time may be calculated to exclude any outage time associated with the customer so that a true outage time calculation, at any given time, may be provided that may be based on down time of the inventory (e.g., circuit, device, etc.) due the customer's network issues. Dashboard web server 140 may use the outage time to provide an indication of the customer's network performance. For example, dashboard web server 140 may display (e.g., via client 110) visual indicators via color coded status bars, degraded duration times, and/or critical duration calculations based on customer-provided ranges. In another example, dashboard web server 140 may permit the customer to review individual components of an outage duration that may be sorted based on circuit product type. In still another example, dashboard web server 140 may correlate and/or present customer data-to-circuit-to-network availability information.

Although FIG. 4 shows exemplary elements of user interface 400, in other implementations, user interface 400 may contain fewer, different, or additional elements than depicted in FIG. 4.

Figure 5:
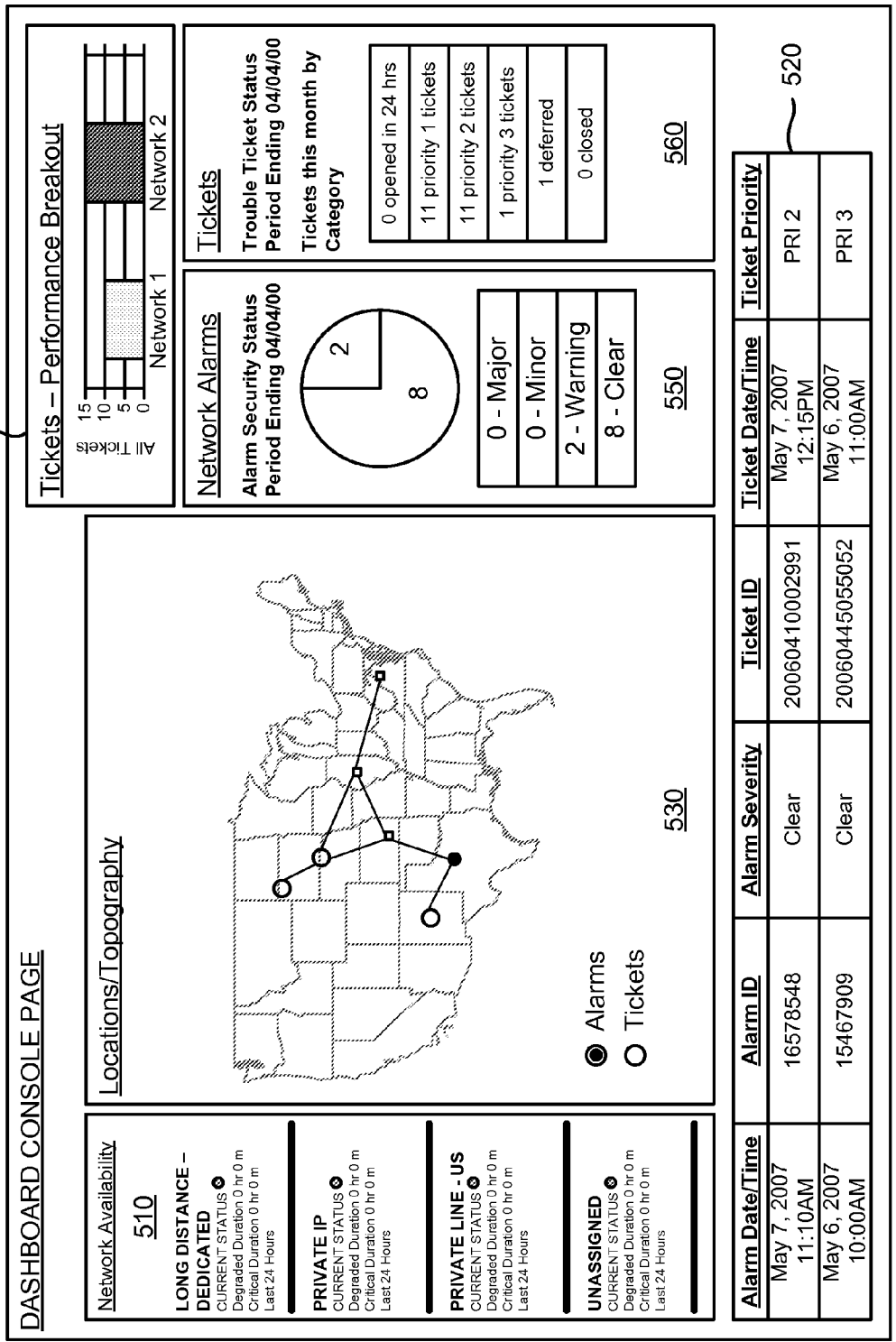
FIG. 5 is a diagram of an exemplary user interface that depicts a dashboard console page, and may be provided by the dashboard web server of FIG. 1.

FIG. 5 is a diagram of an exemplary user interface 500 that depicts a dashboard console page. In one implementation, user interface 500 may be provided by dashboard web server 140 to client 110. As illustrated, the dashboard console page of user interface 500 may depict a variety of information about one or more networks associated with a customer (e.g., a customer who accessed dashboard web server 140 via client 110). For example, the dashboard console page may provide a network availability section 510, an alarms/ticketing section 520, a locations/topography section 530, a tickets performance breakout section 540, a network alarms section 550, and/or a tickets section 560.

Network availability section 510 may provide a list of one or more networks associated with a customer. For example, as shown in FIG. 5, network availability section 510 may depict a dedicated long distance network, a private IP network, a private line network in the United States (U.S.), and an unassigned network that may be associated with a customer. Network availability section 510 may provide information about each network listed therein. For example, as shown in FIG. 5, a current status, a degraded duration (e.g., in hours and minutes over the last twenty-four hours), and/or a critical duration (e.g., in hours and minutes over the last twenty-four hours) for each network depicted in network availability section 510 may be provided.

Alarms/ticketing section 520 may provide a list of information associated with any alarms and/or tickets associated with any inventory of the customer's network(s). For example, as shown in FIG. 5, alarms/ticketing section 520 may depict an alarm date/time category, an alarm identification (ID) category, an alarm severity category, a ticket identification (ID) category, a ticket date/time category, and/or a ticket priority category. In other implementations, alarms/ticketing section 520 may include other categories, such as a network device identification category, a circuit identification category, a service type category, a location category, a description category, etc.

Alarm and/or ticketing information may be associated with each of these categories. For example, the alarm date/time category may include a date and time of "May 7, 2007, 11:10

μM," the alarm ID category may include an ID of "16578548," the alarm severity category may include a severity of "clear," the ticket ID category may include an ID of "20060410002991," the ticket date/time category may include a date and time of "May 7, 2007, 12:15 PM," and/or the ticket priority category may include a priority of "PRI2." Such information may indicate that an alarm occurred in the customer's network (e.g., on a particular device and/or circuit of the network, and/or at a particular location in the network) on May 7, 2007 at 11:10 AM, that the alarm was identified by the number "16578548," and that the alarm had been cleared. Such information may further indicate that a ticket (with a level two priority) identified by the number "20060410002991" was issued on May 7, 2007 at 12:15 PM to address the alarm identified by the number "16578548."

Locations/topography section 530 may provide a visual display (e.g., a map) of locations of inventory items of the customer's network, and/or any alarms and/or tickets associated with the customer's inventory items. For example, as shown in FIG. 5, an alarm may exist for an inventory item (e.g., a circuit, a node, a device, etc.) located in Texas, and a ticket may exist for an inventory item located in New Mexico. In one implementation, a customer may select one of the locations of the inventory items provided by the map in locations/topography section 530, and dashboard web server 140 may display additional details about the selected location. For example, if the customer selected the location of the alarm in Texas, dashboard web server 140 may provide information such as the duration of the alarm, any tickets associated with the alarm, the device or devices associated with the alarm, etc.

Tickets performance breakout section 540 may provide a performance breakout for tickets issued for one or more networks associated with a customer. The performance breakout may be based on a ticket type (e.g., repeat tickets, chronic tickets, number of tickets, etc.). Tickets performance breakout section 540 may further provide a ticket performance breakout for different customers associated with dashboard web server 140 so that customers may see how the network provider (e.g., an owner of the networks and/or dashboard web server 140) are addressing tickets throughout the network provider's supported networks.

Network alarms section 550 may display any alarm conditions occurring in the customer's network, and/or the severity of any alarm conditions. For example, as shown in FIG. 5, the customer's network may include "0" major network alarms, "0" minor network alarms, "2" warning network alarms, and/or "8" network alarms that have cleared alarm status (e.g., an alarm does not exist anymore).

Tickets section 560 may display any tickets related to a maintenance event and/or an alarm condition. Tickets section 560 may provide a status of a ticket, and/or may display a number of tickets in a time period (e.g., monthly, weekly, etc.) by category (e.g., priority, opened, closed, etc.). For example, as shown in FIG. 5, tickets section 560 may indicate that "0" tickets have been opened in the past twenty-four hours, "11" tickets are priority "1" tickets, "11" tickets are priority "2" tickets, "1" ticket is a priority "3" ticket, "1" ticket has been deferred, and "0" tickets have been closed.

Although FIG. 5 shows exemplary elements of user interface 500, in other implementations, user interface 500 may contain fewer, different, or additional elements than depicted in FIG. 5.

Figure 6:
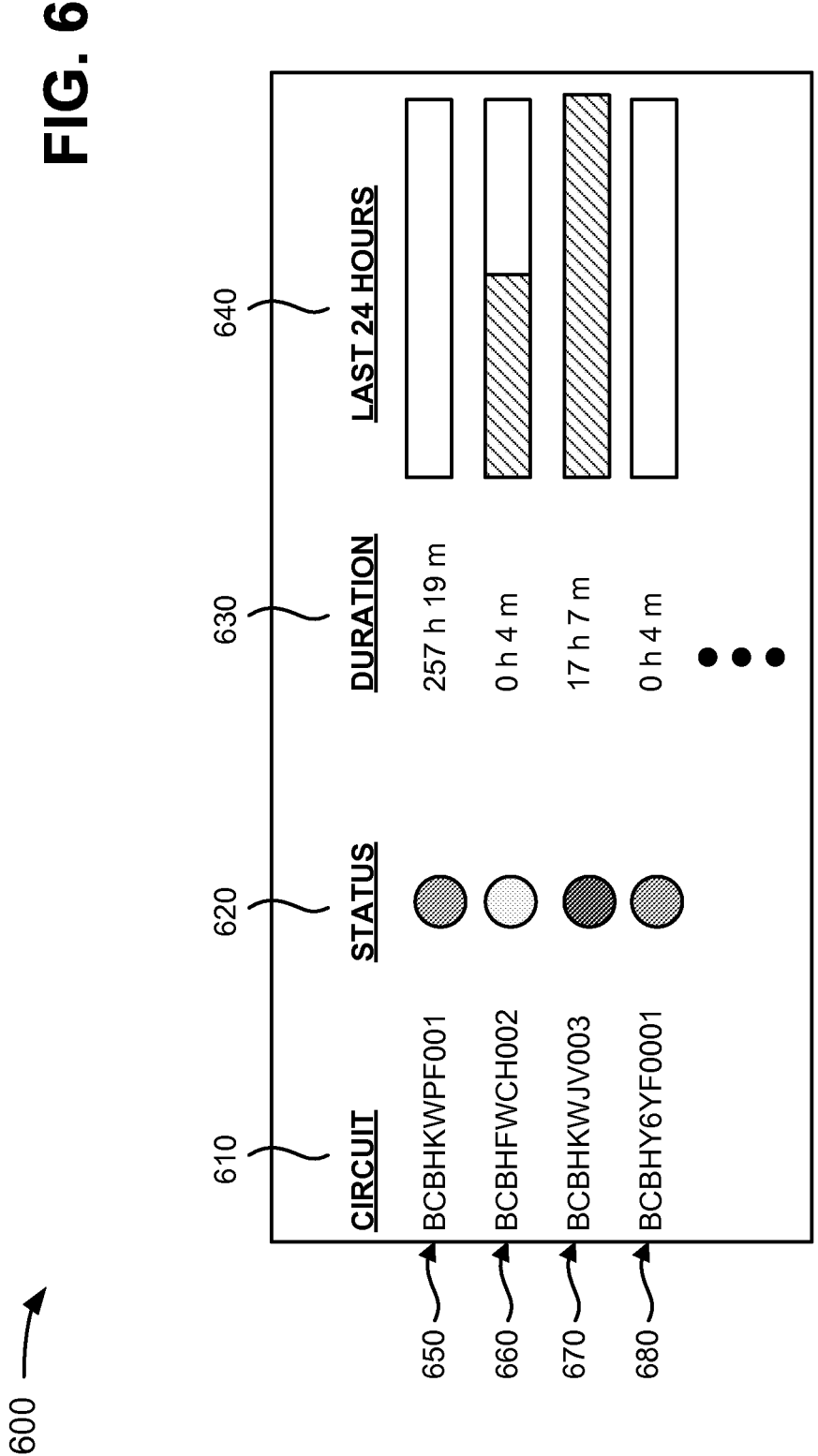
FIG. 6 is a diagram of an exemplary user interface that depicts an alarm and ticket menu, and may be provided by the dashboard web server of FIG. 1.

FIG. 6 is a diagram of an exemplary user interface 500 that depicts an alarm and ticket menu. In one implementation, user interface 600 may be provided by dashboard web server 140 to client 110. As illustrated, the alarm and ticket menu of user interface 600 may depict a variety of information about one or more networks associated with a customer (e.g., a customer who accessed dashboard web server 140 via client 110). For example, the alarm and ticket menu may provide a circuit category 610, a status category 620, a duration category 630, and/or an indicator 640 indicating a status for the last twenty-four hours. Each category may include one or more entries. As shown in FIG. 6, user interface 600 may display a first entry 650, a second entry 660, a third entry 670, and a fourth entry 680. Although user interface 600 depicts four entries, in other implementations, user interface 600 may display fewer, more, or different entries than depicted in FIG. 6. Furthermore, user interface 600 may display fewer, different, or additional categories than depicted in FIG. 6.

Circuit category 610 may provide a list of circuits (or other inventory items) of the customer's network. For example, first entry 650 may include a circuit ID number of "BCBHK-WPF001" under circuit category 610, second entry 660 may include a circuit ID of "BCBHFWCH002" under circuit category 610, third entry 670 may include a circuit ID of "BCB-HKWJV003" under circuit category 610, and fourth entry 680 may include a circuit ID of "BCBHY6YF0001" under circuit category 610.

Status category 620 may provide a visual indication (e.g., green for a functioning circuit, yellow for a circuit with a warning, and/or red for a circuit experiencing an alarm condition) of a status of a circuit provided in circuit category 610. For example, first entry 650 and fourth entry 680 may include a green status indicator under status category 620, second entry 660 may include a yellow status indicator under status category 620, and third entry 670 may include a red status indicator under status category 620.

Duration category 630 may provide the duration (e.g., in hours (h) and minutes (m)) of an alarm and/or a ticket associated with a circuit provided in circuit category 610. For example, first entry 650 may include a duration of "257 h 19 m" under duration category 630, second entry 660 may include a duration of "0 h 4 m" under duration category 630, third entry 670 may include a duration of "17 h 7 m" under duration category 630, and fourth entry 680 may include a duration of "0 h 4 m" under duration category 630.

Indicator 640 may provide a visual indication (e.g., a bar diagram) indicating a status of a circuit provided in circuit category 610 for the past twenty-four hours. For example, first entry 650 and fourth entry 680 may include an indication of circuit functionality under indicator category 640, second entry 660 may include an indication of partial circuit functionality under indicator category 640, and third entry 670 may include an indication of circuit failure under indicator category 640.

Although FIG. 6 shows exemplary elements of user interface 600, in other implementations, user interface 600 may contain fewer, different, or additional elements than depicted in FIG. 6.

Figure 7:
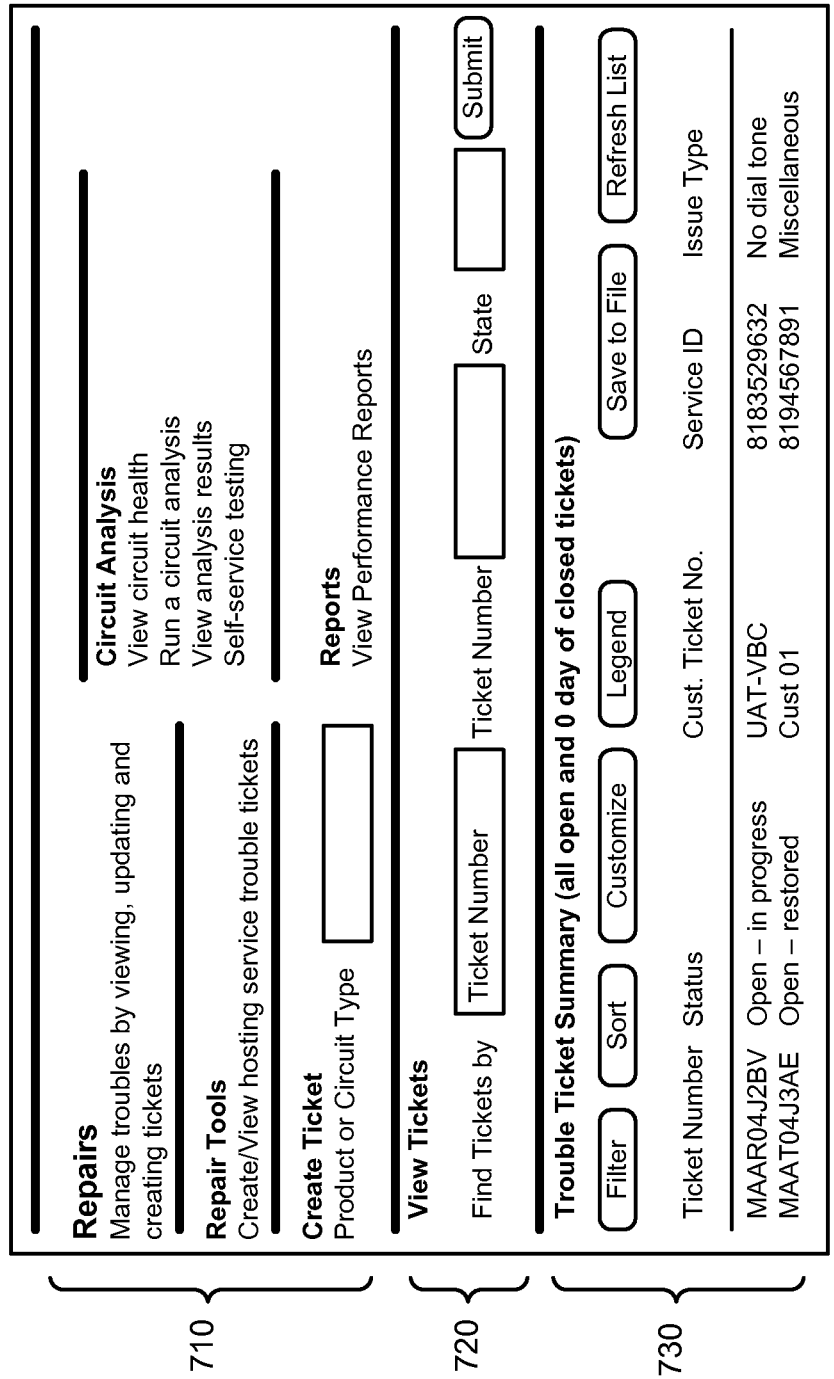
FIG. 7 is a diagram of an exemplary user interface that depicts a repairs and tickets menu, and may be provided by the dashboard web server of FIG. 1.

FIG. 7 is a diagram of an exemplary user interface 700 that depicts a repairs and tickets menu. In one implementation, user interface 700 may be provided by dashboard web server 140 to client 110. As illustrated, the repairs and tickets menu of user interface 700 may depict a variety of information about one or more networks associated with a customer (e.g., a customer who accessed dashboard web server 140 via client 110). For example, the repairs and tickets menu may provide a repairs section 710, a view tickets section 720, and/or a trouble ticket summary section 730.

Repairs section 710 may enable a customer to manage any problems associated with the customer's network. For example, repairs section 710 may include a repair tools portion that may permit the customer to create and view trouble tickets associated with the customer's network. Repairs section 710 may include a create ticket portion that may permit the customer to create a ticket for one or more products or circuits of the customer's network. A circuit analysis portion of repairs section 710 may permit the customer to perform a variety of tasks, such as view circuit health, run a circuit analysis, view circuit analysis results, perform self-service testing, etc. A reports portion of repairs section 710 may permit the customer to view performance reports associated with the customer's network(s).

View tickets section 720 may enable a customer to search for a specific ticket so that the customer may view additional information associated with the specific ticket. For example, the customer may find a ticket based on a ticket number by providing the ticket number and by selecting a submit mechanism. The customer may be provided with additional information associated with the specified ticket number. Alternatively and/or additionally, the customer may find one or more tickets based on location information (e.g., a state where an event addressed by the ticket is occurring) by providing the location information and by selecting the submit mechanism. The customer may be provided with a list of tickets from the specified location, and may select one or more of the listed tickets to see additional ticket information.

Trouble ticket summary section 730 may enable a customer to manage a list of open tickets associated with the customer's network. For example, trouble ticket summary section 730 may provide a list of open tickets, and may display information associated with the open tickets. Such associated information may include a ticket number (e.g., "MAAR04J2BV"), a status (e.g., "Open—in progress"), a customer ticket number (e.g., "UAT-VBC"), a service identification (ID) (e.g., "8183529632"), an issue type (e.g., "No dial tone"), a product type (e.g., "private IP"), a creation date (e.g., "May 17, 2006 at 11:01 AM"), etc. Trouble ticket summary section 730 may provide mechanisms that enable the customer to manage the list of open tickets, such as a filter mechanism (e.g., to enable the customer to filter the list based on a criteria), a sort mechanism (e.g., to enable the customer to sort the list based on a criteria), a customize mechanism (e.g., to enable the customer to customize the list), a legend mechanism (e.g., to enable the customer to adjust the legend of the list), a save-to-file mechanism (e.g., to enable the customer to save the list), and/or a refresh mechanism (e.g., to enable the customer to refresh the list).

Although FIG. 7 shows exemplary elements of user interface 700, in other implementations, user interface 700 may contain fewer, different, or additional elements than depicted in FIG. 7.

Figure 8:
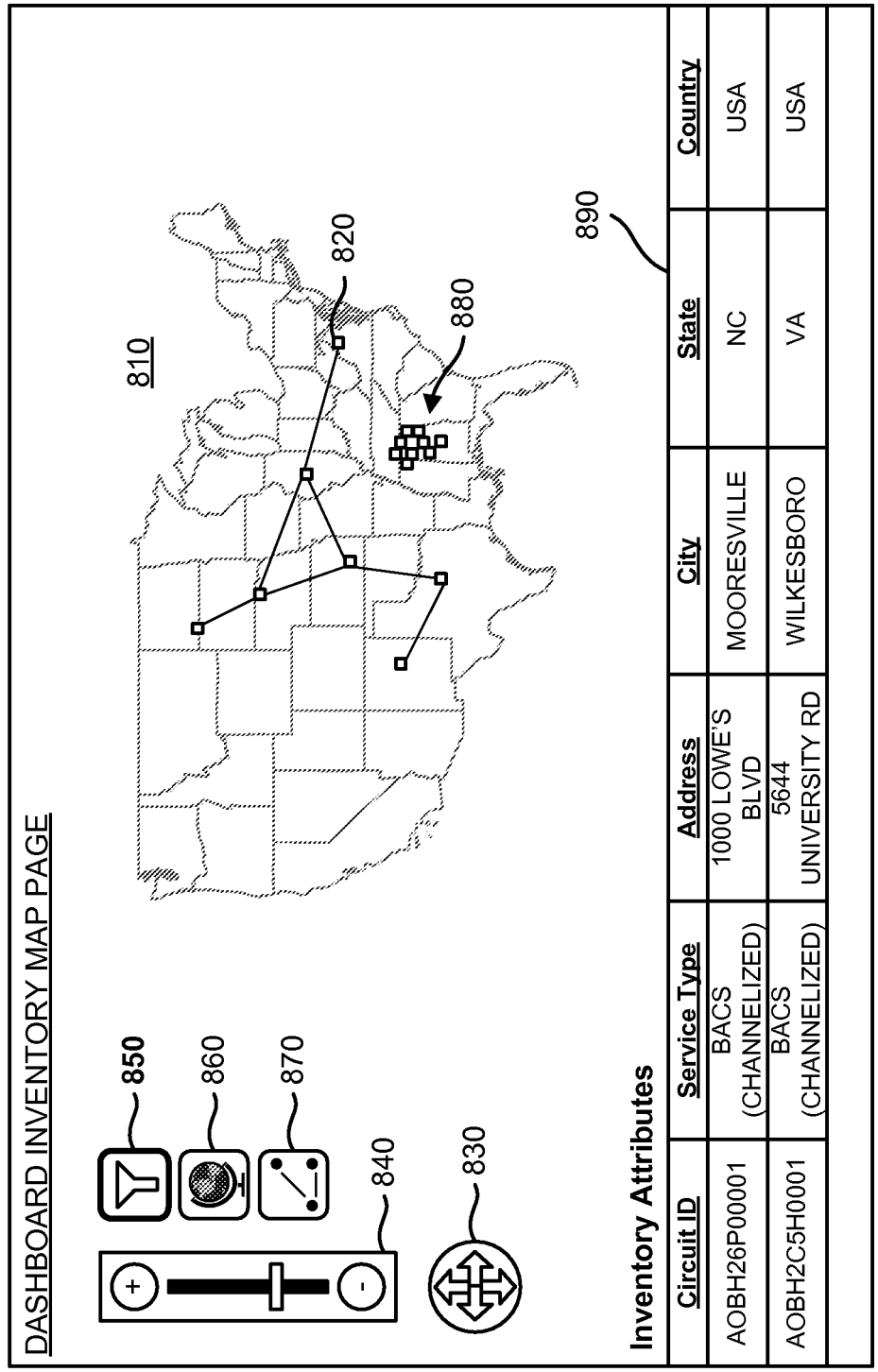
FIG. 8 is a diagram of an exemplary user interface that depicts a dashboard inventory map page, and may be provided by the dashboard web server of FIG. 1.

FIG. 8 is a diagram of an exemplary user interface 800 that depicts a dashboard inventory map page. In one implementation, user interface 800 may be provided by dashboard web server 140 to client 110. As illustrated in FIG. 8, the dashboard inventory map page of user interface 800 may depict a variety of information about one or more networks associated with a customer (e.g., a customer who accessed dashboard web server 140 via client 110). For example, the dashboard inventory map page may provide a map 810 of the customer's one or more networks, network inventory items 820, a view manipulation tool 830, a zoom/pan tool 840, a filtering tool 850, a map view tool 860, a line connections tool 870, a cluster of network inventory items 880, and/or an inventory attributes window 890.

Map 810 may provide a visual display (e.g., a map) of locations of inventory items (e.g., network inventory items 820) of the customer's network, and/or any alarms and/or tickets associated with the customer's inventory items. For example, as shown in FIG. 8, network inventory item 820 (e.g., a circuit, a node, a device, etc.) may be located in Virginia, and may connect to network inventory item 820 located in Illinois. In one implementation, a customer may select one of the locations of network inventory items 820 provided by map 810, and dashboard web server 140 may display additional details about the selected location. For example, if the customer selected the location of network inventory item 820 in Virginia, dashboard web server 140 may provide information such as circuit identification, status information, etc.

Network inventory item 820 may include any hardware (e.g., any circuit, device, node, etc.), any service (e.g., toll free phone numbers, digital subscriber line (DSL) services, etc.), etc. associated with a customer's one or more networks.

View manipulation tool 830 may enable a customer to adjust a view of map 810 (e.g., via a selection mechanism, such as a mouse). For example, view manipulation tool 830 may enable the customer to move map 810 to the right, to the left, upwards, downwards, etc. so that the customer may view different locations of map 810 and/or the customer's network provided by map 810. As shown in FIG. 8, view manipulation tool 830 may include arrows that may permit the customer to manipulate the view of map 810.

Zoom/pan tool 840 may enable a customer to perform zoom and pan operations on map 810 using a selection mechanism (e.g., a mouse). For example, zoom/pan tool 840 may enable the customer to zoom in on any location of the customer's network (e.g., on network inventory item 820 located in Virginia). As illustrated in FIG. 8, zoom/pan tool 840 may include a slide mechanism that may permit a customer to zoom on map 810 (e.g., by moving the slide toward the "+" sign) and/or to pan out of map 810 (e.g., by moving the slide toward the "−" sign).

Filtering tool 850 may enable a customer to filter, clutter (e.g., add), and/or declutter (e.g., reduce) a number of network elements (e.g., network inventory items 820, alarms, tickets, maintenance events, etc.) displayed by map 810 using one or more algorithms. For example, in one implementation, filtering tool 850 and its associated algorithms may permit the customer to view network inventory items 820 and/or any available network services based on type (e.g., based on circuit product type (i.e., frame relay, long distance, private IP), device type, etc.), and/or may correlate the viewed inventory items 820 and/or services to current, real time fault management alarms and/or tickets displayed by map 810. In another implementation, filtering tool 850 and its associated algorithms may permit the customer to view certain types of alarm severities or ticket types at Service Delivery Points (SDPs), and/or to view all alarms and tickets filtered based on a service type (e.g., a frame relay service type). As illustrated in FIG. 8, if the customer selects filtering tool 850, the algorithms may filter map 810 to prevent showing of cluster 880 of network inventory items 820. For example, filtering tool 850 may enable map 810 to display a single network inventory item 820 instead of cluster 880.

Map view tool 860 may enable a customer to switch backgrounds for map 810. For example, map view tool 860 may enable the customer to select between a geographical map or a political map. In one implementation, if the customer would like a detailed view of map 810, the customer may select a geographical map with map view tool 860, and dashboard web server 140 may display map 810 as a geographical map. In other implementations, if the customer would like a simpler view of map 810, the customer may select a political map with map view tool 860, and dashboard web server 140 may display map 810 as a political map. Further details of map view tool 860 are provided below in connection with FIG. 9.

Line connections tool 870 may enable a customer to hide lines connecting two or more network inventory items 820, and/or to show lines connecting two or more network inventory items 820. Lines may show interconnections between elements of the customer's network. For example, if map 810 displays lines connecting two or more network inventory items 820, the customer may select line connections tool 870 (e.g., with a selection mechanism) and map 810 may cease displaying the lines. In another example, if map 810 does not display lines connecting two or more network inventory items 820, the customer may select line connections tool 870 (e.g., with selection mechanism) and map 810 may display the lines. In one implementation, line connections tool 870 may permit the customer to selectively hide and/or display lines connecting two or more network inventory items 820. Further details of line connections tool 870 are provided below in connection with FIG. 10.

Cluster 880 may include multiple network inventory items 820 provided within close proximity to one another. For example, as shown in FIG. 8, cluster 880 may include multiple network inventory items 820 provided in and in the vicinity of Alabama, Mississippi, and Tennessee. As described above, filtering tool 850 may be used to display clusters 880 (e.g., to clutter) on map 810, and/or to prevent display of clusters 880 (e.g., to declutter or filter) on map 810.

Inventory attributes window 890 may include information about the customer's network that may be synchronized to the customer's field of view of map 810. For example, if map 810 displays the customer's network in California (i.e., the field of view is in California), inventory attributes window 890 may include information about the customer's network (e.g., network inventory items 820) in California. In another example, if map 810 displays the customer's network in Texas, inventory attributes window 890 may include information about the customer's network in Texas. As shown in FIG. 8, inventory attributes window 890 may include information associated with the customer's network, such as circuit identification (ID), service type, address, city, state, country, etc.

Although FIG. 8 shows exemplary elements of user interface 800, in other implementations, user interface 800 may contain fewer, different, or additional elements than depicted in FIG. 8.

Figure 9:
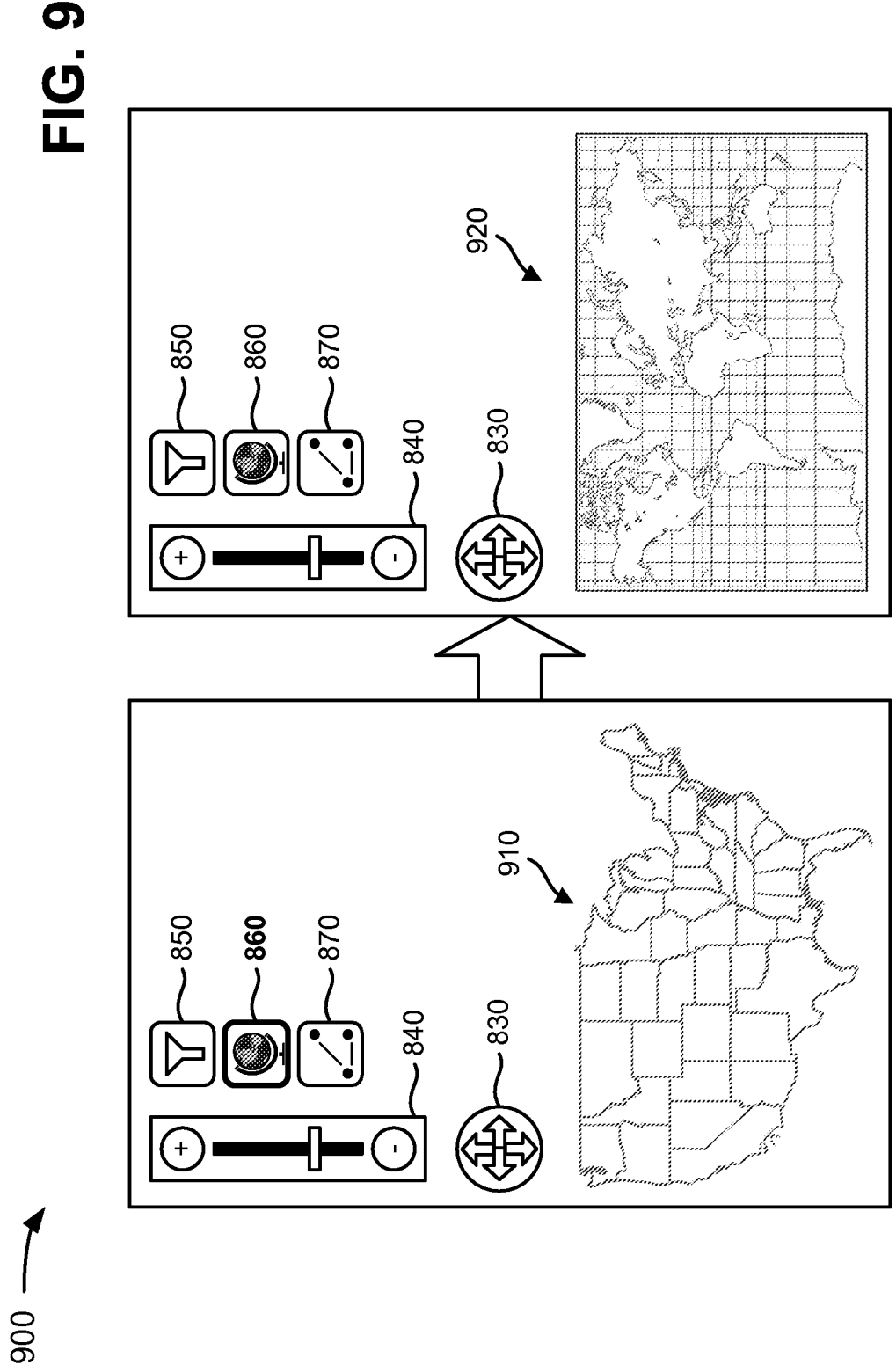
FIG. 9 is a diagram of an exemplary user interface that depicts different map views associated with the dashboard inventory map page of FIG. 8.

If a customer selects (e.g., with a selection mechanism) map view tool 860 provided by user interface 800 (e.g., by pointing and clicking on the element), an exemplary user interface 900 as shown in FIG. 9 may be displayed. User interface 900 may depict different map views associated with the dashboard inventory map page of FIG. 8. In one implementation, user interface 900 may be provided by dashboard web server 140 to client 110. As illustrated, user interface 900 may depict a variety of information about one or more networks associated with a customer (e.g., a customer who accessed dashboard web server 140 via client 110). For example, user interface 900 may provide view manipulation tool 830, zoom/pan tool 840, filtering tool 850, map view tool 860, line connections tool 870, a political map 910, and/or a geographical map 920. View manipulation tool 830, zoom/pan tool 840, filtering tool 850, map view tool 860, and line connections tool 870 may include the features described above in connection with FIG. 8.

As described above in connection with FIG. 8, map view tool 860 may enable a customer to switch backgrounds for map 810. If the customer would like a simple map, the customer may select map view tool 860, and dashboard web server 140 may display political map 910. Political map 910 may provide a visual display (e.g., a map) of locations of inventory items (e.g., network inventory items 820) of the customer's network, and/or any alarms and/or tickets associated with the customer's inventory items. In one example, as shown in FIG. 9, political map 910 may display a map of a country (e.g., the continental United States), and/or the customer's one or more networks (not shown).

If the customer would like a detailed map, the customer may select map view tool 860, and dashboard web server 140 may display geographical map 920. Geographical map 920 may provide a visual display (e.g., a map) of locations of inventory items (e.g., network inventory items) of the customer's network, and/or any alarms and/or tickets associated with the customer's inventory items. In one example, as shown in FIG. 9, geographical map 920 may display a map of a large region (e.g., the world), and/or the customer's one or more networks (not shown).

Although FIG. 9 shows exemplary elements of user interface 900, in other implementations, user interface 900 may contain fewer, different, or additional elements than depicted in FIG. 9.

Figure 10:
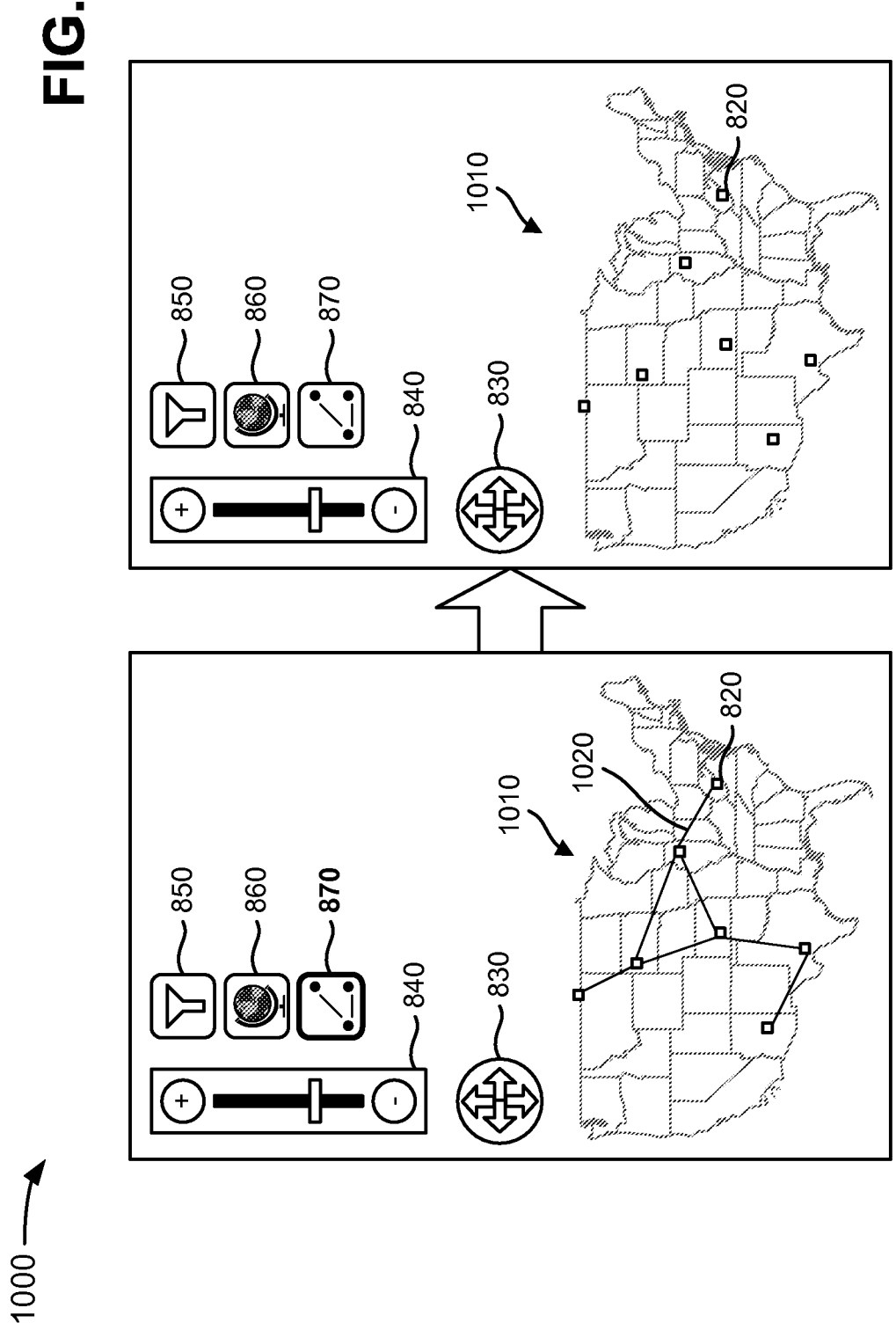
FIG. 10 is a diagram of an exemplary user interface that depicts turning on and/or off circuit line connections associated with the dashboard inventory map page of FIG. 8.

If a customer selects (e.g., with a selection mechanism) line connections tool 870 provided by user interface 800 (e.g., by pointing and clicking on the element), an exemplary user interface 1000 as shown in FIG. 10 may be displayed. User interface 1000 may depict different map views associated with the dashboard inventory map page of FIG. 8. In one implementation, user interface 1000 may be provided by dashboard web server 140 to client 110. As illustrated, user interface 1000 may depict a variety of information about one or more networks associated with a customer (e.g., a customer who accessed dashboard web server 140 via client 110). For example, user interface 1000 may provide network inventory items 820, view manipulation tool 830, zoom/pan tool 840, filtering tool 850, map view tool 860, line connections tool 870, a map 1010, and/or lines 1020 connecting network inventory items 820. Network inventory items 820, view manipulation tool 830, zoom/pan tool 840, filtering tool 850, map view tool 860, and line connections tool 870 may include the features described above in connection with FIG. 8.

Map 1010 may provide a visual display (e.g., a map) of locations of inventory items (e.g., network inventory items) of the customer's network, and/or any alarms and/or tickets associated with the customer's inventory items. In one example, as shown in FIG. 10, map 1010 may include network inventory items 820 and/or lines 1020 connecting network inventory items 820 of the customer's one or more networks.

As described above in connection with FIG. 8, line connections tool 870 may enable a customer to hide lines 1020 connecting two or more network inventory items 820, and/or to show lines 1020 connecting two or more network inventory items 820. Lines 1020 may show interconnections between elements of the customer's network. For example, if map 1010 displays lines 1020 connecting network inventory items 820 (as shown to the left in FIG. 10), the customer may select line connections tool 870 (e.g., with a selection mechanism) and map 1010 may cease displaying lines 1020 (as shown to the right in FIG. 10). In another example, if map 1010 does not display lines 1020 connecting two or more network inventory items 820 (as shown to the right in FIG. 10), the customer may select line connections tool 870 (e.g., with selection mechanism) and map 1010 may display lines 1020 (as shown to the left in FIG. 10). In one implementation, line connections tool 870 may permit the customer to selectively hide and/or display lines 1020 connecting two or more network inventory items 820.

Although FIG. 10 shows exemplary elements of user interface 1000, in other implementations, user interface 1000 may contain fewer, different, or additional elements than depicted in FIG. 10.

Figure 11:
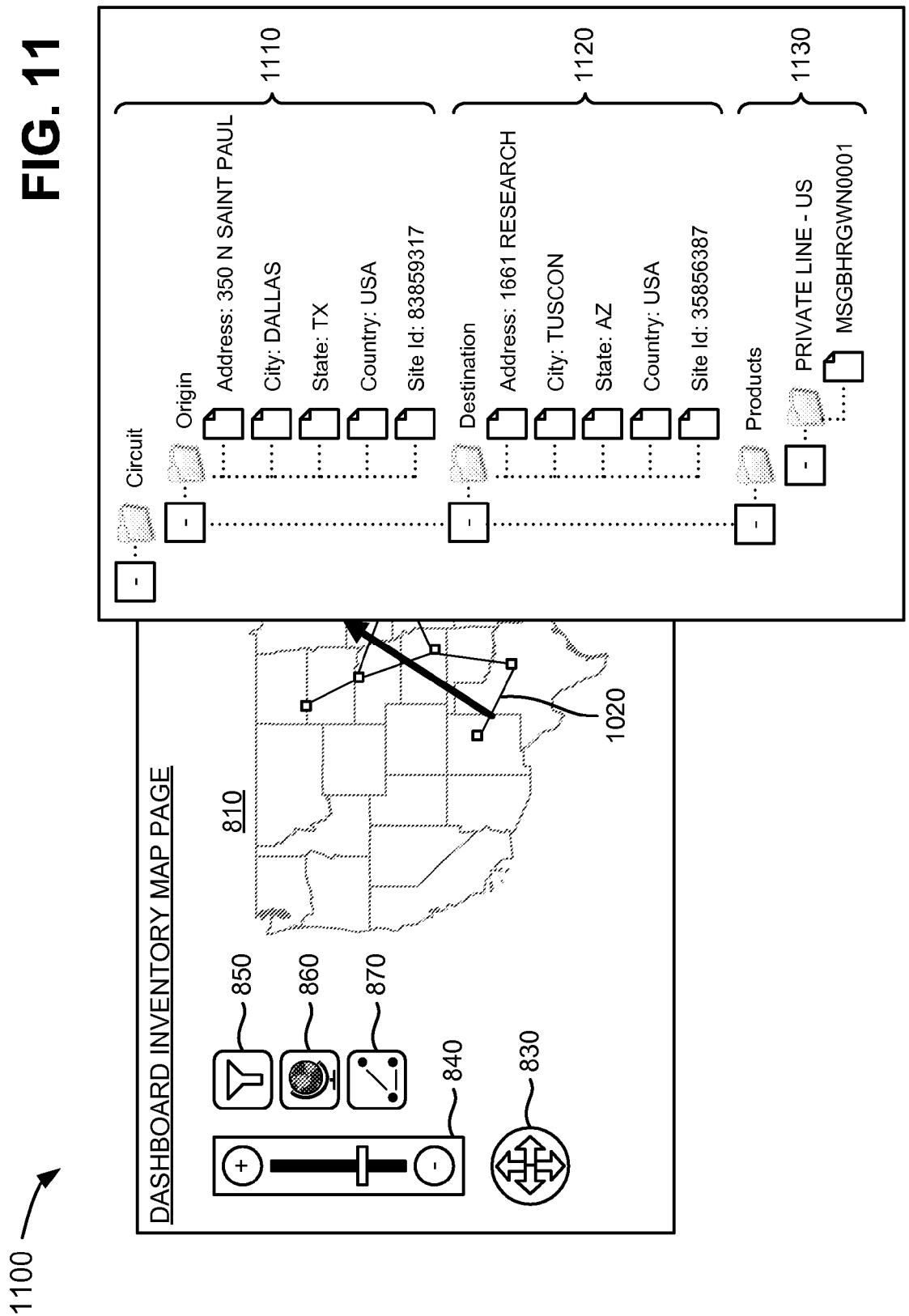
FIG. 11 is a diagram of an exemplary user interface that depicts inventory details associated with the dashboard inventory map page of FIG. 8.

If a customer selects (e.g., with a selection mechanism) line 1020 provided by user interface 1000 (e.g., by pointing and clicking on the element), an exemplary user interface 1100 as shown in FIG. 11 may be displayed. User interface 1100 may depict inventory details associated with the dashboard inventory map page of FIG. 8. In one implementation, user interface 1100 may be provided by dashboard web server 140 to client 110. As illustrated, user interface 1100 may depict a variety of information about one or more networks associated with a customer (e.g., a customer who accessed dashboard web server 140 via client 110). For example, user interface 1100 may provide map 810, view manipulation tool 830, zoom/pan tool 840, filtering tool 850, map view tool 860, line connections tool 870, a selected line 1020, circuit origin information 1110 associated with the selected line 1020, destination information 1120 associated with the selected line 1020, and/or product information 1130 associated with the selected line 1020. Map 810, view manipulation tool 830, zoom/pan tool 840, filtering tool 850, map view tool 860, line connections tool 870, and line 1020 may include the features described above in connection with FIG. 8.

Circuit origin information 1110 may include information associated with an origin of the selected line 1020. For example, circuit origin information 1110 may include address information (e.g., "Address: 350 N SAINT PAUL"), city information (e.g., "City: DALLAS"), state information (e.g., "State: TX"), country information (e.g., "Country: USA"), and/or site identification information (e.g., "Site Id: 83859317").

Destination information 1120 may include information associated with a destination of the selected line 1020. For example, destination information 1120 may include address information (e.g., "Address: 1661 RESEARCH"), city information (e.g., "City: TUSCON"), state information (e.g., "State: AZ"), country information (e.g., "Country: USA"), and/or site identification information (e.g., "Site Id: 35856387").

Product information 1130 may include information associated with products included in the selected line 1020. For example, product information 1130 may include service information (e.g., "PRIVATE LINE—US"), device information (e.g., "MSGBHRGWN0001"), etc.

Although FIG. 11 shows exemplary elements of user interface 1100, in other implementations, user interface 1100 may contain fewer, different, or additional elements than depicted in FIG. 11.

Figure 12:
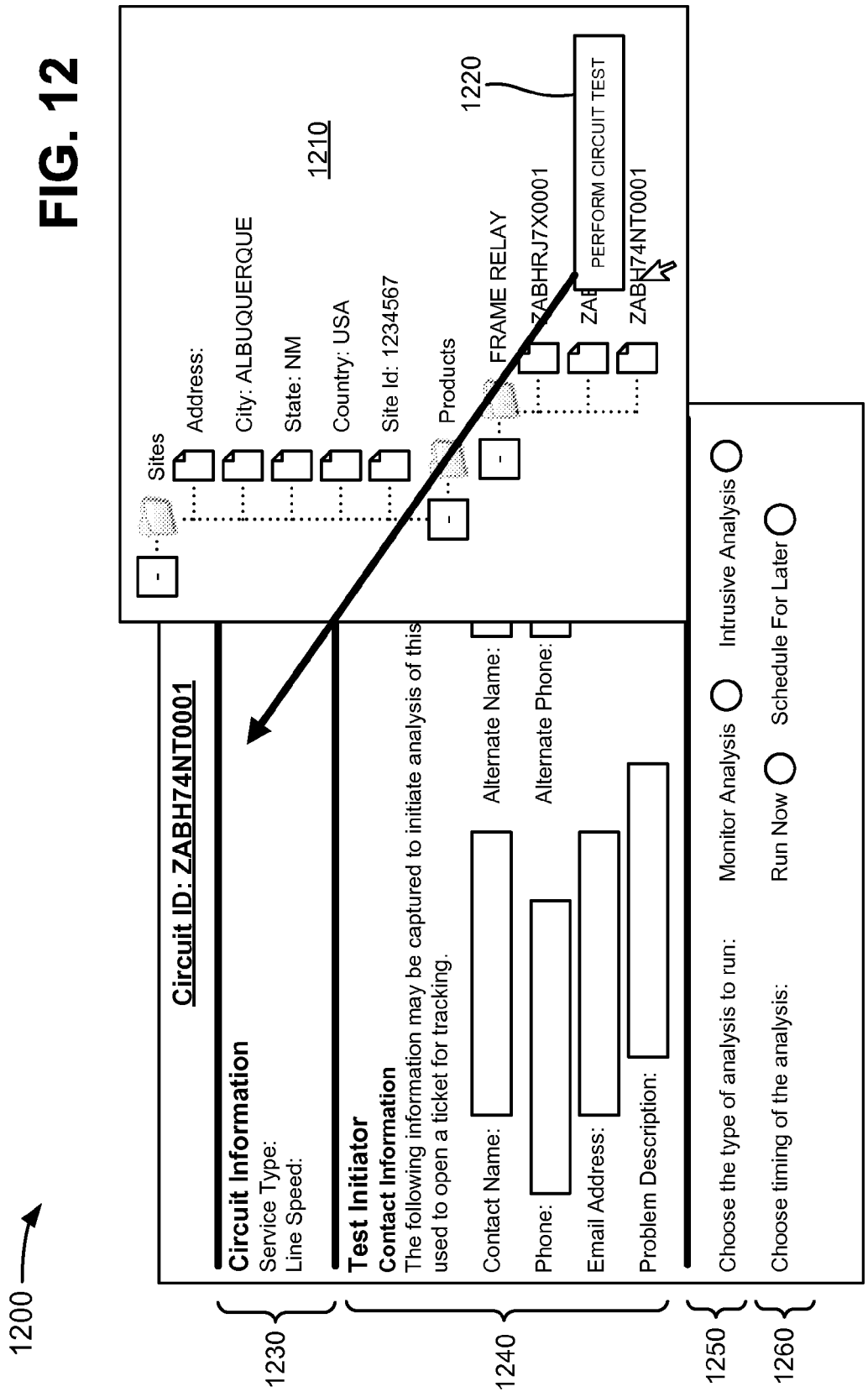
FIG. 12 is a diagram of an exemplary user interface that depicts circuit information, and may be provided by the dashboard web server of FIG. 1.

FIG. 12 is a diagram of an exemplary user interface 1200 that depicts circuit information. In one implementation, user interface 1200 may be provided by dashboard web server 140 to client 110. As illustrated, user interface 1200 may depict a variety of information about one or more networks associated with a customer (e.g., a customer who accessed dashboard web server 140 via client 110). For example, user interface 1200 may provide a circuit information window 1210, a perform circuit test window 1220, a circuit information input section 1230, a test initiator input section 1240, an analysis selection mechanism 1250, and/or a timing selection mechanism 1260.

Circuit information window 1210 may include information associated with a circuit of the customer's network. In one implementation, for example, circuit information window 1210 may include the information described above in connection with FIG. 11. As illustrated in FIG. 12, circuit information window 1210 may include site information (e.g., address, city, state, country, sited identification, etc.) associated with a circuit, and/or product information (e.g., frame relay, "ZABH74NT0001," etc.) associated with a circuit.

If a customer selects information provided by circuit information window 1210 (e.g., a customer selects circuit "ZABH74NT0001"), perform circuit test window 1220 may be displayed. If the customer selects perform circuit test window 1220, elements 1230-1260 of user interface 1200 may displayed, and may enable the customer to perform a circuit test on the selected circuit.

Circuit information input section 1230 may enable a customer to input information associated with the circuit to be tested. For example, as shown in FIG. 12, circuit information input section 1230 may include a service type and/or a line speed for the circuit to be tested.

Test initiator input section 1240 may enable a customer to input information associated with an initiator of the circuit test. In one implementation, the information received in test initiator input section 1240 may be used to initiate analysis of the circuit to be tested, and/or to open a ticket for tracking the circuit test. As shown in FIG. 12, test initiator input section 1240 may include and/or may request a customer to input a contact name, a telephone number, an email address, a problem description, an alternate contact name, and/or an alternate telephone number.

Analysis selection mechanism 1250 may enable a customer to select a type of analysis to perform on the circuit to be tested. For example, as illustrated in FIG. 12, analysis selection mechanism 1250 may enable the customer to monitor the analysis of the tested circuit (e.g., "Monitor Analysis") and/or to perform an intrusive analysis of the tested circuit (e.g., "Intrusive Analysis").

Timing selection mechanism 1260 may enable a customer to select timing for the analysis of the tested circuit. For example, as illustrated in FIG. 12, timing selection mechanism 1260 may permit the customer to perform the analysis immediately (e.g., "Run Now") and/or to schedule the analysis for a later time (e.g., "Schedule For Later").

Although FIG. 12 shows exemplary elements of user interface 1200, in other implementations, user interface 1200 may contain fewer, different, or additional elements than depicted in FIG. 12.

Figure 13:
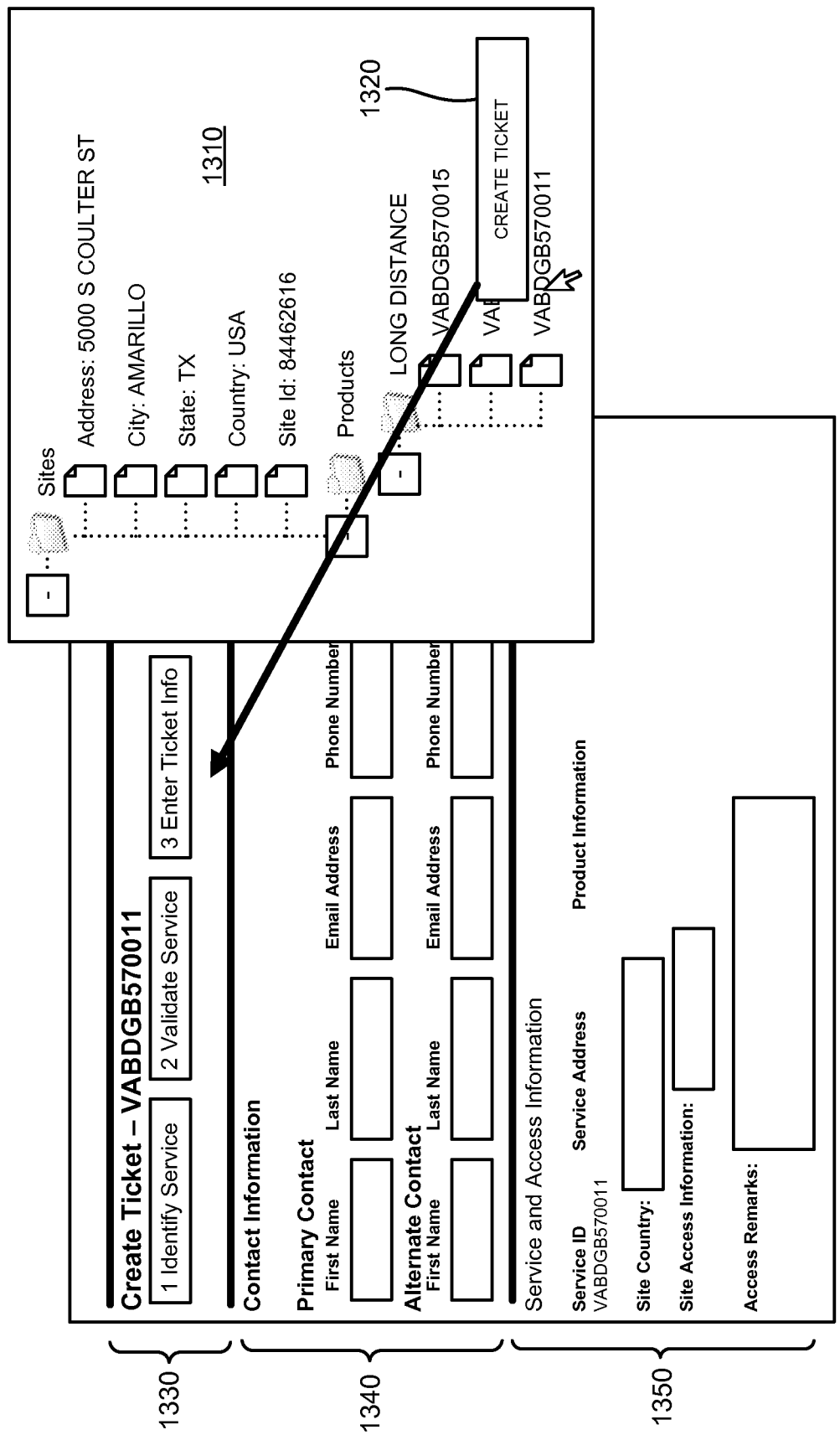
FIG. 13 is a diagram of an exemplary user interface that depicts creation of a ticket, and may be provided by the dashboard web server of FIG. 1.

FIG. 13 is a diagram of an exemplary user interface 1300 that depicts creation of a ticket. In one implementation, user interface 1300 may be provided by dashboard web server 140 to client 110. As illustrated, user interface 1300 may depict a variety of information about one or more networks associated with a customer (e.g., a customer who accessed dashboard web server 140 via client 110). For example, user interface 1300 may provide a circuit information window 1310, a create ticket window 1320, a create ticket information section 1330, a contact information input section 1340, and/or a service and access information input section 1350.

Circuit information window 1310 may include information associated with a circuit of the customer's network. In one implementation, for example, circuit information window 1310 may include the information described above in connection with FIG. 11. As illustrated in FIG. 13, circuit information window 1310 may include site information (e.g., address, city, state, country, sited identification, etc.) associated with a circuit, and/or product information (e.g., long distance, "VABDGB570011" etc.) associated with a circuit.

If a customer selects information provided by circuit information window 1310 (e.g., a customer selects circuit "VABDGB570011"), create ticket window 1320 may be displayed. If the customer selects create ticket window 1320, elements 1330-1350 of user interface 1300 may be displayed, and may enable the customer to create a ticket for the selected circuit.

Create ticket information section 1330 may include information associated with the selected ticket. For example, as shown in FIG. 13, create ticket information section 1330 may include the selected circuit name (e.g., "CABDGB570011"), and/or information about how to create a ticket for the selected circuit (e.g., "Identify Service," "Validate Service," "Enter Ticket Info," etc.).

Contact information input section 1340 may enable a customer to input information associated with the creator of the ticket. In one implementation, the information received in contact information input section 1340 may be used to create a ticket for the selected circuit. As shown in FIG. 13, contact information input section 1340 may include and/or may request a customer to input primary contact information (e.g., a first name, a last name, an email address, a telephone number, etc. of the primary contact for the ticket) and/or alternate contact information (e.g., a first name, a last name, an email address, a telephone number, etc. of the alternate contact for the ticket).

Service and access information input section 1350 may enable a customer to input information associated with service and/or access information for the ticket. In one implementation, the information received in service and access information input section 1350 may be used to create a ticket for the selected circuit. As shown in FIG. 13, service and access information input section 1350 may include service identification information (e.g., "Service ID VABDGB570011"), service address information (e.g., "Service Address"), product information, site information (e.g., "Site Country" and "Site Access Information"), and/or access information (e.g., "Access Remarks").

Although FIG. 13 shows exemplary elements of user interface 1300, in other implementations, user interface 1300 may contain fewer, different, or additional elements than depicted in FIG. 13.

Figure 14:
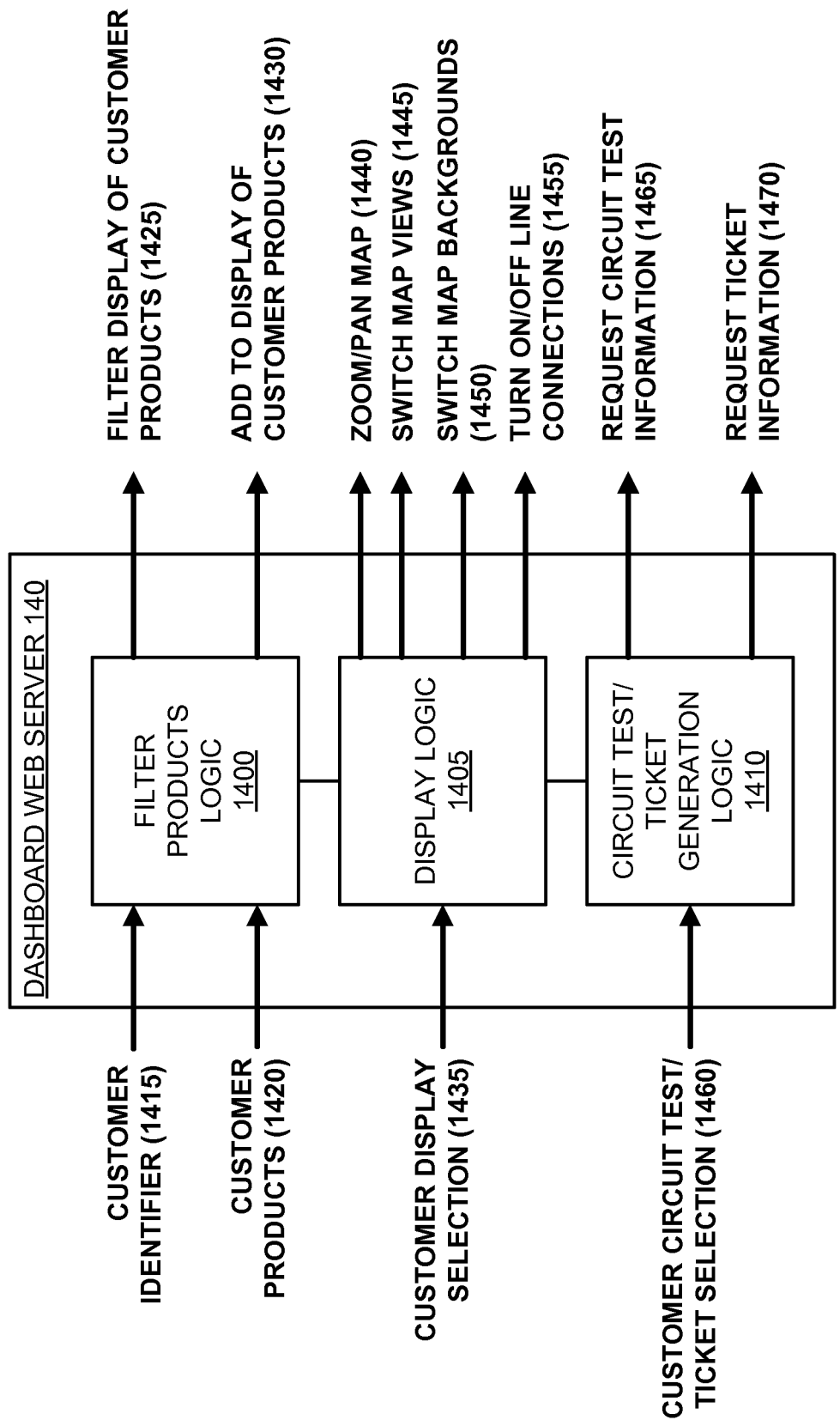
FIG. 14 is a diagram depicting exemplary functions capable of being performed by the dashboard web server of FIG. 1.

FIG. 14 is a diagram depicting exemplary functions capable of being performed by a dashboard web server 140. As illustrated, dashboard web server 140 may include a variety of functional components, such as filter products logic 1400, display logic 1405, and/or circuit test and/or ticket generation logic 1410.

Filter products logic 1400 may receive a customer identifier 1415 and/or one or more customer products 1420, and may filter, clutter (add), and declutter (reduce) display of customer products 1420. Filter products logic 1400 may use algorithms, described above in connection with FIG. 8, to filter (reduce) display of customer products 1420 (as indicated by reference number 1425) and/or to add to (increase) the display of customer products 1420 (as indicated by reference number 1430). For example, as described above in connection with FIG. 8, filter products logic 1400 may permit the customer to view network inventory items 820 and/or any available network services based on type (e.g., based on circuit product type (i.e., frame relay, long distance, private IP), device type, etc.), and/or may correlate the viewed inventory items 820 and/or services to current, real time fault management alarms and/or tickets displayed by map 810. In another implementation, filter products logic 1400 may permit the customer to view certain types of alarm severities or ticket types at Service Delivery Points (SDPs), and/or to view all alarms and tickets filtered based on a service type (e.g., a frame relay service type).

Display logic 1405 may receive a customer display selection 1435, and may display information provided by a map (e.g., map 810) based on customer display selection 1435. In one implementation, display logic 1405 may permit a customer to perform zoom and/or pan operations on the map, as indicated by reference number 1440. In another implementation, display logic 1405 may permit the customer to switch a field of view of the map (e.g., to move the map left, right, upwards, downwards, etc.), as indicated by reference number 1445. In still another implementation, display logic 1405 may permit the customer to switch map backgrounds (e.g., from a political map to a geographical map, and vice versa), as indicated by reference number 1450. In a further implementation, display logic 1405 may permit the customer to turn on and/or off lines (e.g., lines 1020) connecting network inventory items (e.g., network inventory items 820), as indicated by reference number 1455.

Circuit test/ticket generation logic 1410 may receive a customer circuit test and/or ticket selection 1460, and/or may request circuit test information 1465 and/or may request ticket information 1470 based on circuit test/ticket selection 1460. For example, in one implementation, if circuit test/ticket generation logic 1410 receives a circuit test selection, circuit test/ticket generation logic 1410 may request the information set forth in user interface 1200 of FIG. 12. In another implementation, if circuit test/ticket generation logic 1410 receives a ticket selection, circuit test/ticket generation logic 1410 may request the information set forth in user interface 1300 of FIG. 13.

Customer identifier 1415 may include any mechanism used to identify a customer. For example, in one implementation, dashboard web server 140 may incorporate systems that include different customer identifiers (e.g., corporate identifications (IDs), billing account numbers, Network Application Service Provider (NASP) IDs, subNASP IDs, Domain Name System (DNS) short names, etc.). In other implementations, custom identifier 1415 may include other mechanisms used to identify customers (e.g., stock symbols, tax identifications, etc.).

Customer products 1420 may include information related to any inventory (e.g., any circuit, device, node, etc.), any service (e.g., toll free phone numbers, digital subscriber line (DSL) services, etc.), etc. associated with a customer's one or more networks.

Filtering display of customer products 1425 may include displaying network inventory items 820 and/or any available network service filtered based on type (e.g., based on circuit product type (i.e., frame relay, long distance, private IP), device type, etc.), displaying certain types of alarm severities or ticket types at Service Delivery Points (SDPs), and/or displaying all alarms and tickets filtered based on a service type (e.g., a frame relay service type).

Adding to display of customer products 1430 may include adding network inventory items for display (e.g., via map 810) based on type (e.g., based on circuit product type (i.e., frame relay, long distance, private IP), device type, service type, etc.).

Customer display selection 1435 may include any display selection capable of being received from a customer. For example, customer display selection 1435 may include selection of one or more of view manipulation tool 830, zoom/pan tool 840, filtering tool 850, map view tool 860, and/or line connections tool 870.

Zoom/pan map 1440 may include performing zoom and/or pan operations on a display of a map (e.g., map 810). Switch map views 1445 may include switching a field of view of a map (e.g., to move the map left, right, upwards, downwards, etc.). Switch map backgrounds 1450 may include switching map backgrounds (e.g., from a political map to a geographical map, and vice versa). Turn on/off line connections 1455 may include turning on and/or off lines (e.g., lines 1020) connecting network inventory items (e.g., network inventory items 820).

Customer circuit test/ticket selection 1460 may include a customer's selection of a circuit test and/or a customer's selection of a ticket. For example, as described above in connection with FIG. 12, if a customer selects perform circuit test window 1220, elements 1230-1260 of user interface 1200 may displayed, and may enable the customer to perform a circuit test on the selected circuit. In another example, as described above in connection with FIG. 13, if a customer selects create ticket window 1320, elements 1330-1350 of user interface 1300 may displayed, and may enable the customer to create a ticket for the selected circuit.

Request circuit test information 1465 may include requesting information associated with a selected circuit test. For example, as described above in connection with FIG. 12, request circuit test information 1465 may include providing circuit information input section 1230 to enable a customer to input information associated with the circuit to be tested, test initiator input section 1240 to enable a customer to input information associated with an initiator of the circuit test, analysis selection mechanism 1250 to enable a customer to select a type of analysis to perform on the circuit to be tested, and/or timing selection mechanism 1260 to enable a customer to select timing for the analysis of the tested circuit.

Request ticket information 1470 may include requesting information associated with a ticket. For example, as described above in connection with FIG. 13, request ticket information 1470 may include providing contact information input section 1340 to enable a customer to input information associated with creator of the ticket, and/or service and access information input section 1350 to enable a customer to input information associated with service and/or access information for the ticket.

In one implementation, dashboard web server 140 may use customer identifier 1415 and customer products 1420 to provide any services described above as being provided by dashboard web server 140. For example, dashboard web server 140 may use customer identifier 1415 and customer products 1420 to provide any of the user interfaces described above in connection with FIGS. 4-7. If a customer logs into dashboard web server 140 (e.g., via the login page of user interface 400), dashboard web server 140 may associate the customer with customer identifier 1415, and may display the associated customer products 1420 (e.g., circuits, devices, alarms, maintenance events) to the customer via user interfaces 400-700, as described above in connection with FIGS. 4-7.

Although FIG. 14 shows exemplary functional components of dashboard web server 140, in other implementations, dashboard web server 140 may contain fewer, different, or additional functional components than depicted in FIG. 14. In still other implementations, one or more functional components of dashboard web server 140 may perform one or more of the tasks performed by one or more other functional components of dashboard web server 140.

Figure 15:
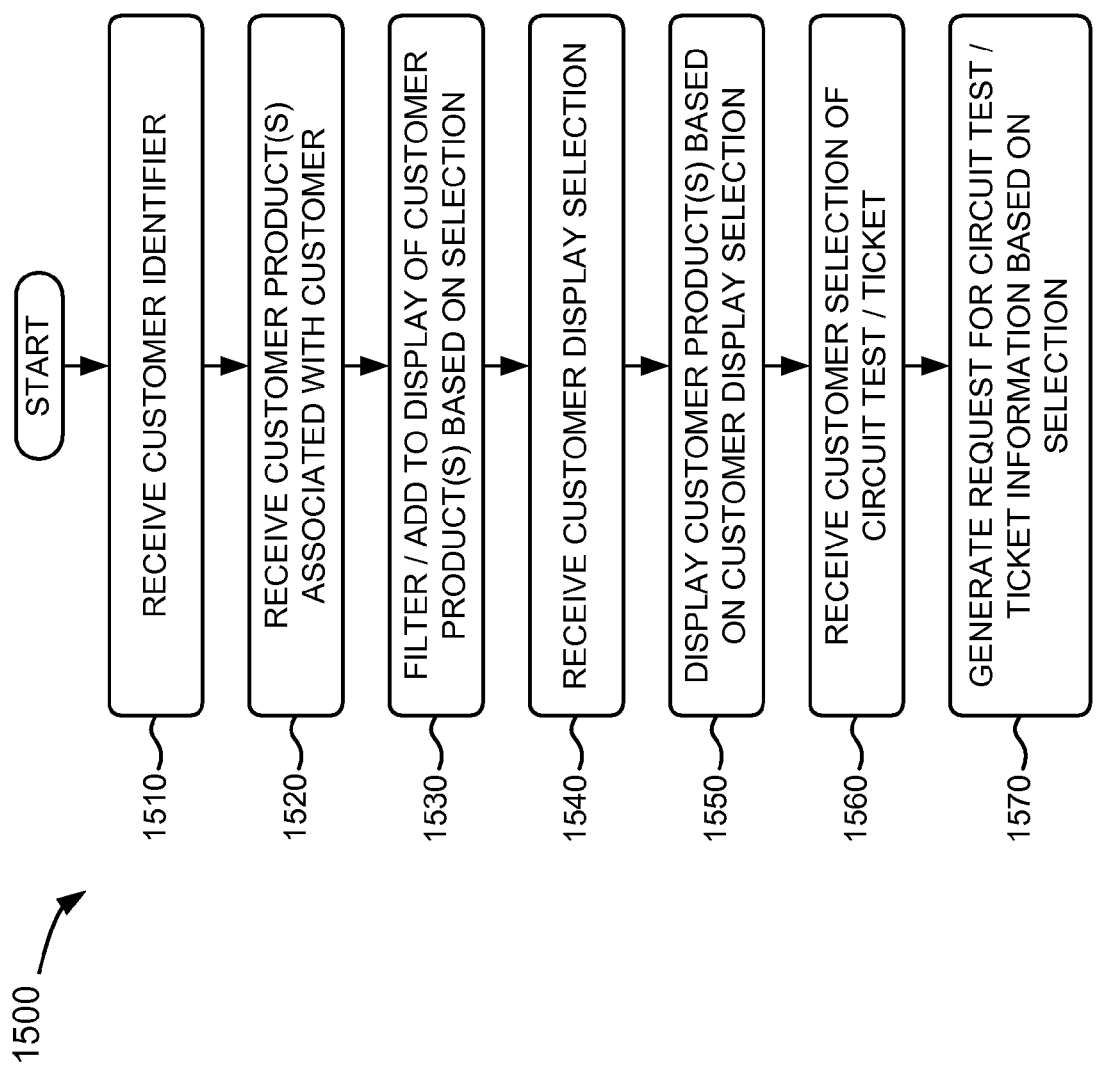
FIGS. 15 and 16 depicts a flow chart of an exemplary process for providing a dashboard map filtering and/or clutter/declutter algorithms according to implementations described herein.

FIG. 15 depicts a flow chart of an exemplary process 1500 for providing a dashboard map filtering and/or clutter/declutter algorithms according to implementations described herein. In one implementation, process 1500 may be performed by dashboard web server 140. As illustrated, process 1500 may begin with receipt of a customer identifier associated with a customer (block 1510), and receipt of one or more customer products associated with the customer (block 1520). For example, in one implementation described above in connection with FIG. 14, filter products logic 1400 of dashboard web server 140 may receive customer identifier 1415 and/or one or more customer products 1420.

As further shown in FIG. 15, a display of the one or more customer products may be added to and/or filtered (reduced) based on a customer selection (block 1530). For example, in one implementation described above in connection with FIG. 14, filter products logic 1400 may filter, clutter (add), and declutter (reduce) display of customer products 1420. Filter products logic 1400 may use algorithms, described above in connection with FIG. 8, to filter (reduce) display of customer products 1420 (as indicated by reference number 1425) and/or to add to (increase) the display of customer products 1420 (as indicated by reference number 1430).

As also shown in FIG. 15, a display selection may be received from the customer (block 1540), and one or more customer products may be displayed based on the customer display selection (block 1550). For example, in one implementation described above in connection with FIG. 14, display logic 1405 of dashboard web server 140 may receive customer display selection 1435, and may display information provided by a map (e.g., map 810) based on customer display selection 1435.

As further shown in FIG. 15, a selection of a circuit test and/or a ticket may be received from the customer (block 1560), and a request for circuit test and/or ticket information may be generated based on the selection (block 1570). For example, in one implementation described above in connection with FIG. 14, circuit test/ticket generation logic 1410 of dashboard web server 140 may receive customer circuit test and/or ticket selection 1460, and/or may request circuit test information 1465 and/or may request ticket information 1470 based on circuit test/ticket selection 1460. In one example, if circuit test/ticket generation logic 1410 receives a circuit test selection, circuit test/ticket generation logic 1410 may request the information set forth in user interface 1200 of FIG. 12. In another example, if circuit test/ticket generation logic 1410 receives a ticket selection, circuit test/ticket generation logic 1410 may request the information set forth in user interface 1300 of FIG. 13.

Figure 16:
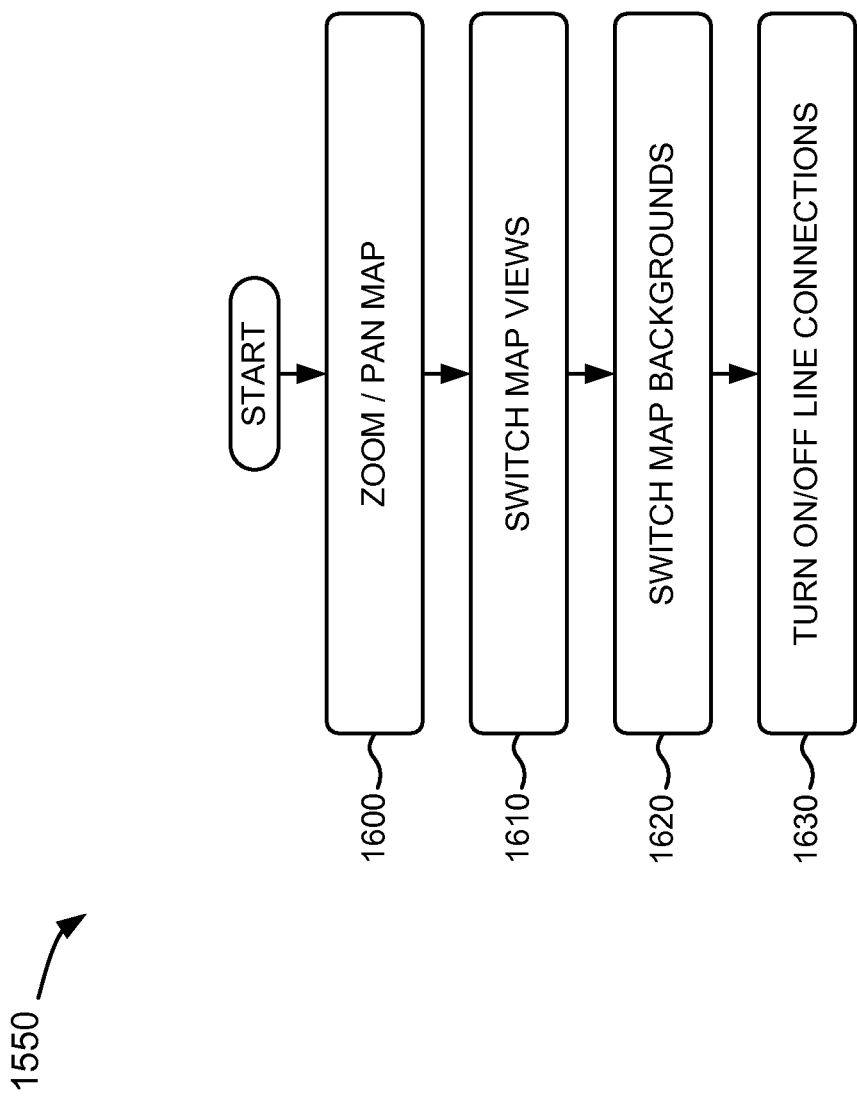

Process block 1550 may include the process blocks illustrated in FIG. 16. As shown in FIG. 16, process block 1550 may include performing a zoom and/or pan operation on a map (block 1600). For example, in one implementation described above in connection with FIG. 8, zoom/pan tool 840 may enable a customer to perform zoom and pan operations on map 810 using a selection mechanism (e.g., a mouse). In one example, zoom/pan tool 840 may enable the customer to zoom in on any location of the customer's network (e.g., on network inventory item 820 located in Virginia). Zoom/pan tool 840 may include a slide mechanism that may permit a customer to zoom on map 810 (e.g., by moving the slide toward the "+" sign) and/or to pan out of map 810 (e.g., by moving the slide toward the "−" sign).

As also shown in FIG. 16, process block 1550 may include switching a view of the map (block 1610). For example, in one implementation described above in connection with FIG. 8, view manipulation tool 830 may enable a customer to adjust a view of map 810 (e.g., via a selection mechanism, such as a mouse). In one example, view manipulation tool 830 may enable the customer to move map 810 to the right, to the left, upwards, downwards, etc. so that the customer may view different locations of map 810 and/or the customer's network provided by map 810. View manipulation tool 830 may include arrows that may permit the customer to manipulate the view of map 810.

Returning to FIG. 16, process block 1550 may include switching backgrounds of the map (block 1620). For example, in one implementation described above in connection with FIG. 8, map view tool 860 may enable a customer to switch backgrounds for map 810. In one example, map view tool 860 may enable the customer to select between a geographical map or a political map. If the customer would like a detailed view of map 810, the customer may select a geographical map with map view tool 860, and dashboard web server 140 may display map 810 as a geographical map. If the customer would like a simpler view of map 810, the customer may select a political map with map view tool 860, and dashboard web server 140 may display map 810 as a political map.

As further shown in FIG. 16, process block 1550 may include turning on and/or off line connections. For example, in one implementation described above in connection with FIG. 8, line connections tool 870 may enable a customer to hide lines connecting two or more network inventory items 820, and/or to show lines connecting two or more network inventory items 820. Lines may show interconnections between elements of the customer's network. If map 810 displays lines connecting two or more network inventory items 820, the customer may select line connections tool 870 (e.g., with a selection mechanism) and map 810 may cease displaying the lines. If map 810 does not display lines connecting two or more network inventory items 820, the customer may select line connections tool 870 (e.g., with selection mechanism) and map 810 may display the lines.

Figure 17:
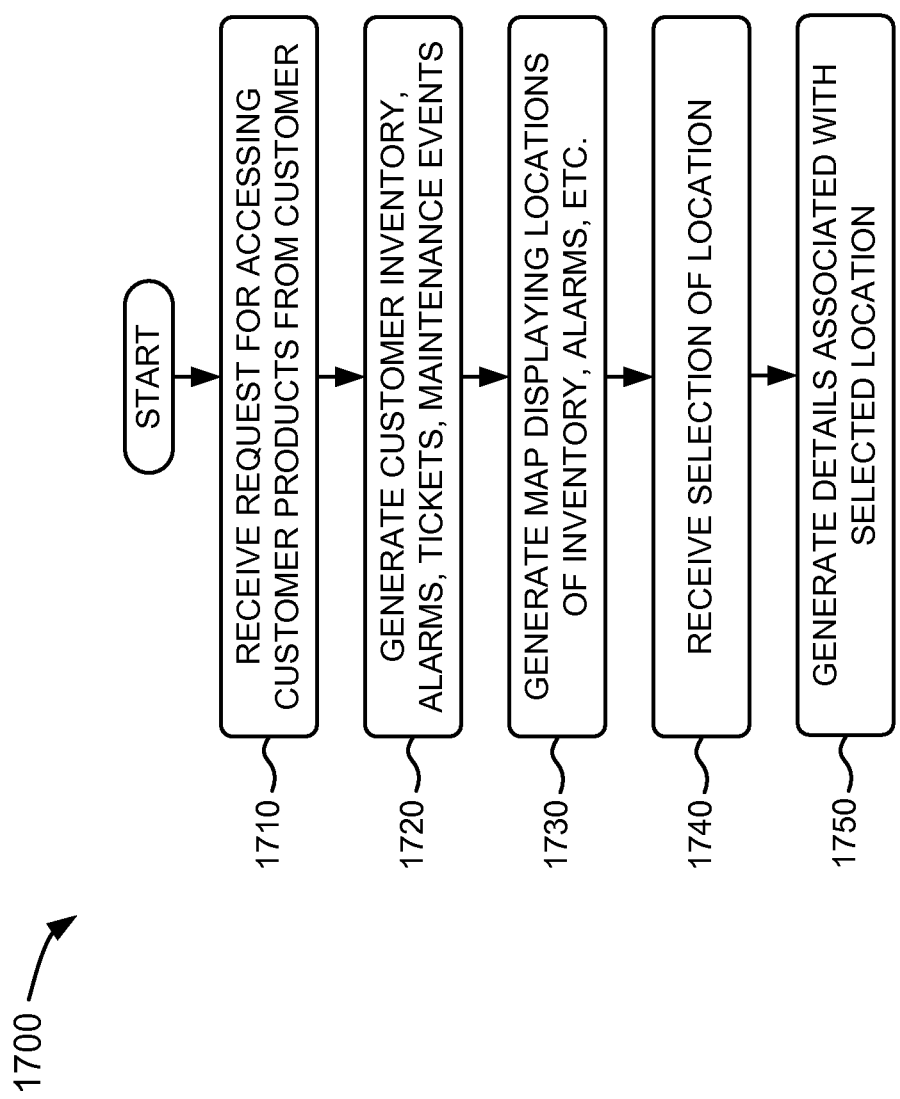
FIG. 17 depicts a flow chart of an exemplary process for providing a dashboard according to implementations described herein.

FIG. 17 depicts a flow chart of an exemplary process 1700 for providing a dashboard according to implementations described herein. In one implementation, process 1700 may be performed by dashboard web server 140. As illustrated, process 1700 may begin with receipt of a request for accessing one or more customer products from a customer (block 1710). For example, in one implementation described above in connection with FIG. 4, a customer may request access to one or more customer products by accessing dashboard-related pages via the login page of user interface 400. If a customer successfully logs into dashboard web server 140 (e.g., via input of correct information into user ID field 410 and password field 420 of the login page), user interface 400 (e.g., via dashboard web server 140) may present the dashboard summary page shown in FIG. 4.

As further shown in FIG. 17, inventory, alarms, tickets, maintenance events, etc. associated with the customer may be generated (block 1720), and a map displaying locations of the inventory, alarms, tickets, maintenance events, etc. may be generated (block 1730). For example, in one implementation described above in connection with FIG. 4, dashboard web server 140 may display the dashboard summary page of user interface 400. The dashboard summary page may display information related to network alarms (e.g., network alarms section 440), tickets (e.g., tickets section 450), locations/topography of inventory (e.g., locations/topography section 460), etc. that may be associated with the customer who logged in via the login page of user interface 400. In another implementation described above in connection with FIG. 5, dashboard web server 140 may display the dashboard console page of user interface 500. The dashboard console page may provide a network availability section 510, an alarms/ticketing section 520, a locations/topography section 530, a tickets performance breakout section 540, a network alarms section 550, and/or a tickets section 560. Locations/topography section 530 may provide a visual display (e.g., a map) of locations of inventory items of the customer's network, and/or any alarms and/or tickets associated with the customer's inventory items.

Returning to FIG. 17, a selection of a location on the map may be received (block 1740), and details associated with the selected location may be generated (block 1750). For example, in one implementation described above in connection with FIG. 5, a customer may select one of the locations of the inventory items provided by the map in locations/topography section 530, and dashboard web server 140 may display additional details about the selected location. For example, if the customer selected the location of the alarm in Texas, dashboard web server 140 may provide information such as the duration of the alarm, any tickets associated with the alarm, the device or devices associated with the alarm, etc.

Implementations described herein may include systems and methods that provide a dashboard for presentation and/or mapping of a customer's inventory and any alarms, tickets, and/or maintenance events associated with the customer's inventory. For example, in one implementation, the systems and methods may provide dashboard map filtering and/or clutter/declutter algorithms that display one or more customer products (e.g., inventory, tickets, alarms, etc.) based on the filtering and/or clutter/declutter algorithms. The dashboard map filtering and/or clutter/declutter algorithms may receive a customer display selection, and/or may display one or more customer products based on the customer display selection. The dashboard map filtering and/or clutter/declutter algorithms may receive a customer selection of a circuit test and/or ticket creation, and/or may generate a request for a circuit test and/or ticket information based on the selection.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 12 and 13, the order of the acts may be modified in other implementations. Further, non-dependent acts may be performed in parallel.

Also, the terms "user" and "customer" have been used herein. The terms "user" and "customer" are intended to be broadly interpreted to include a client (e.g., client 110) or a user or customer of a client.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a server device, information regarding a plurality of products, associated with a customer of a network and provided by the network,
        the information regarding the plurality of products including information regarding at least one of a circuit, a device, or a service associated with the network;
    generating, by the server device, a first graphical user interface,
        the first graphical user interface including:
            a first geographic map that includes the information regarding each of the plurality of products, and
            a selectable filtering tool that enables the customer to access information regarding ones of the plurality of products based on product types associated with the plurality of products;
    providing, by the server device, the first graphical user interface to a client device associated with the customer;
    receiving, by the server device and from the client device, a customer selection via the selectable filtering tool;
    identifying, by the server device, the product types associated with the plurality of products based on the customer selection;
    selectably filtering, by the server device, the plurality of products based on the identified product types;
    generating, by the server device, a second graphical user interface that includes a second geographic map that presents information regarding the selectably filtered products,
        the selectably filtered products being a subset of the plurality of products; and
    providing, by the server device, the second graphical user interface to the client device.

2. The method of claim 1, further comprising:
    receiving an identifier associated with the customer of the network; and
    identifying the plurality of products based on the received identifier.

3. The method of claim 2, where receiving the identifier comprises:
    receiving, as the identifier, at least one of:
        a corporate identification,
        a billing account number,
        a Network Application Service Provider (NASP) identification,
        a subNASP identification,
        a Domain Name System (DNS) short name,
        a stock symbol, or
        a tax identification associated with the customer.

4. The method of claim 1, where generating the second graphical user interface comprises:
    correlating the plurality of products to current management alarms or tickets; and
    filtering the plurality of products based on service types associated with the current management alarms or tickets.

5. The method of claim 1, further comprising:
    receiving a display selection from the customer; and
    providing the information regarding the plurality of products based on the display selection to the client device for display.

6. The method of claim 1, further comprising:
    receiving, from the client device, a selection of one of a circuit test or a ticket; and
    generating one of a request for circuit test information or a request for ticket information based on the selection.

7. The method of claim 1, further comprising:
    receiving, from the client device, a request for accessing information regarding the plurality of products; and
    generating, based on receiving the request, at least one of customer inventory, alarms, tickets, or maintenance events associated with the network.

8. The method of claim 7, where receiving the request comprises:
    receiving a customer identification and a customer password.

9. The method of claim of claim 7, where generating the at least one of customer inventory, alarms, tickets, or maintenance events comprises at least one of:
    generating the information regarding the at least one of a circuit, a device, or a service;
    generating an alarm associated with the at least one of a circuit, a device, or a service provided by the network;
    generating a ticket to address a problem associated with the at least one of a circuit, a device, or a service provided by the network; or
    generating a maintenance event to perform maintenance on the at least one of a circuit, a device, or a service provided by the network.

10. The method of claim 7, further comprising:
    generating a third graphical user interface that includes a third geographic map displaying locations of the at least one of customer inventory, alarms, tickets, or maintenance events associated with the network.

11. The method of claim 10, further comprising:
    receiving a selection of a location on the third geographic map; and
    providing, for presentation, details associated with the selected location.

12. The method of claim 10, where generating the third graphical user interface comprises:
    providing, for presentation on the third geographic map, symbols with unique shapes or color coding that correspond to the at least one of customer inventory, alarms, tickets, or maintenance events.

13. A system comprising:
    one or more devices to:
        generate a first graphical user interface,
            the first graphical user interface including a first geographic map that includes information regarding each of a plurality of products associated with a customer of a network and provided by the network,
                the information regarding the plurality of products including information regarding at least one of a circuit, a device, or a service associated with the network, and
            the first graphical user interface including a selectable filtering tool that enables the customer to access information regarding ones of the plurality of products based on product types associated with the plurality of products;
        provide the first graphical user interface to a client device associated with the customer;
        receive a customer selection via the selectable filtering tool;
        identify the product types associated with the plurality of products based on the customer selection;

selectably filter the plurality of products based on the identified product types;
generate a second graphical user interface that includes a second geographic map that presents information regarding the selectably filtered products,
the selectably filtered products being a subset of the plurality of products; and
provide the second graphical user interface to the client device.

14. The system of claim 13, where the one or more devices are further to:
receive an identifier associated with the customer of the network; and
identify the plurality of products based on the received identifier.

15. The system of claim 14, where the identifier comprises at least one of:
a corporate identification,
a billing account number,
a Network Application Service Provider (NASP) identification,
a subNASP identification,
a Domain Name System (DNS) short name,
a stock symbol, or
a tax identification associated with the customer.

16. The system of claim 13, where the one or more devices are further to:
receive a display selection from the customer; and
provide, for presentation, the information regarding the plurality of products based on the display selection.

17. The system of claim 16, where the display selection includes one of:
performing a zoom operation on the second geographic map,
performing a pan operation on the second geographic map,
switching a view of the second geographic map to a different view,
switching a background associated with the second geographic map, or
turning on and off line connections.

18. The system of claim 16, where the information regarding the plurality of products is provided, for presentation, on the second geographic map.

19. The system of claim 13, where the one or more devices are further to:
receive, from the customer, a selection of one of a circuit test or a ticket; and
generate one of a request for circuit test information or a request for ticket information based on the selection.

20. The system of claim 19, where the request for circuit test information includes at least one of:
a circuit information input section,
a test initiator input section,
an analysis selection mechanism, or
a timing selection mechanism.

21. The system of claim 19, where the request for ticket information includes at least one of:
a create ticket information section,
a contact information input section, or
a service and access information input section.

22. A non-transitory computer-readable storage medium storing instructions, the instructions comprising:
one or more instructions which, when executed by at least one processor, cause the at least one processor to:
generate a first graphical user interface,
the first graphical user interface including a first geographic map that includes information regarding each of a plurality of products associated with a customer of a network and provided by the network,
the information regarding the plurality of products including information regarding at least one of a circuit, a device, or a service associated with the network, and
the first graphical user interface including a selectable filtering tool that enables the customer to access information regarding ones of the plurality of products based on product types associated with the plurality of products;
provide the first graphical user interface to a client device associated with the customer;
receive a customer selection via the selectable filtering tool;
identify the product types associated with the plurality of products based on the customer selection;
selectably filter the plurality of products based on the identified product types;
generate a second graphical user interface that includes a second geographic map that presents information regarding the selectably filtered products,
the selectably filtered products being a subset of the plurality of products; and
provide the second graphical user interface to the client device.

23. The non-transitory medium of claim 22, where the one or more instructions to generate the second graphical user interface include:
one or more instructions to correlate the plurality of products to current management alarms or tickets; and
one or more instructions to filter the plurality of products based on service types associated with the current management alarms or tickets.

24. The non-transitory medium of claim 22, where the instructions further include:
one or more instructions to receive a request for accessing information regarding the plurality of products; and
one or more instructions to generate, based on receiving the request, at least one of customer inventory, alarms, tickets, or maintenance events associated with the network.

25. The non-transitory medium of claim 22, where the instructions further include:
one or more instructions to generate a third graphical user interface that includes a third geographic map displaying locations of the at least one of customer inventory, alarms, tickets, or maintenance events associated with the network,
the one or more instructions to generate the third graphical user interface including:
one or more instructions to provide, for presentation on the third geographic map, symbols with unique shapes or color coding that correspond to the at least one of customer inventory, alarms, tickets, or maintenance events.
one or more instructions to receive a selection of a location on the third geographic map; and
one or more instructions to provide, for presentation, details associated with the selected location.

* * * * *